United States Patent [19]

Shugar et al.

[11] Patent Number: 4,742,473

[45] Date of Patent: May 3, 1988

[54] FINITE ELEMENT MODELING SYSTEM

[76] Inventors: Joel K. Shugar, 303 Nigara Falls Blvd., Buffalo, N.Y. 14226; Robert k. Cohen, 244 Hansen Ave., Albany, N.Y. 12208

[21] Appl. No.: 755,683

[22] Filed: Jul. 16, 1985

[51] Int. Cl.$^4$ .............................................. G06F 3/37
[52] U.S. Cl. .................................. 364/518; 340/723; 340/707; 364/521
[58] Field of Search ............... 364/188, 190, 518, 521; 340/707, 709, 710, 711, 720, 723, 724, 734, 794

[56] References Cited

U.S. PATENT DOCUMENTS

| | | | |
|---|---|---|---|
| 3,732,557 | 5/1973 | Evans et al. | 340/710 |
| 4,129,858 | 12/1978 | Hara | 340/707 |
| 4,190,835 | 2/1980 | Buynak | 340/750 |
| 4,318,096 | 3/1982 | Thornburg et al. | 340/710 X |
| 4,451,895 | 5/1984 | Sliwkowski | 364/521 |
| 4,506,336 | 3/1985 | Hird | 340/710 X |
| 4,517,559 | 5/1985 | Deitch et al. | 340/794 X |
| 4,577,187 | 3/1986 | Barr et al. | 340/709 X |
| 4,587,520 | 5/1986 | Astle | 340/710 X |
| 4,625,202 | 11/1986 | Richmond et al. | 340/707 X |

Primary Examiner—Gary V. Harkcom
Assistant Examiner—H. R. Herndon
Attorney, Agent, or Firm—Heslin & Rothenberg

[57] ABSTRACT

A Finite Element Analysis system having intelligent, interactive user interface features allows engineers without specialized knowledge in mathematical modeling to easily and interactively solve diverse problems. The system includes a digitizer tablet having a segmented work surface for entering pictorial data and for alternately selecting among processing modes from a menu. Alternate displays on a status screen are automatically correlated with the user positioning of a stylus on the digitizer tablet surface to provide the user with the information he needs for a particular contemplated action. A graphics screen displays a dumb cursor which tracks the position of the stylus in the graphics workspace of the digitizer tablet. An intelligent cursor automatically drawn on the graphics screen by a computer processor identifies a site of interest nearest the current location of the dumb cursor. The intelligent cursor anticipates the user's action in a selected mode and constrains these actions to valid operations within that mode.

32 Claims, 16 Drawing Sheets

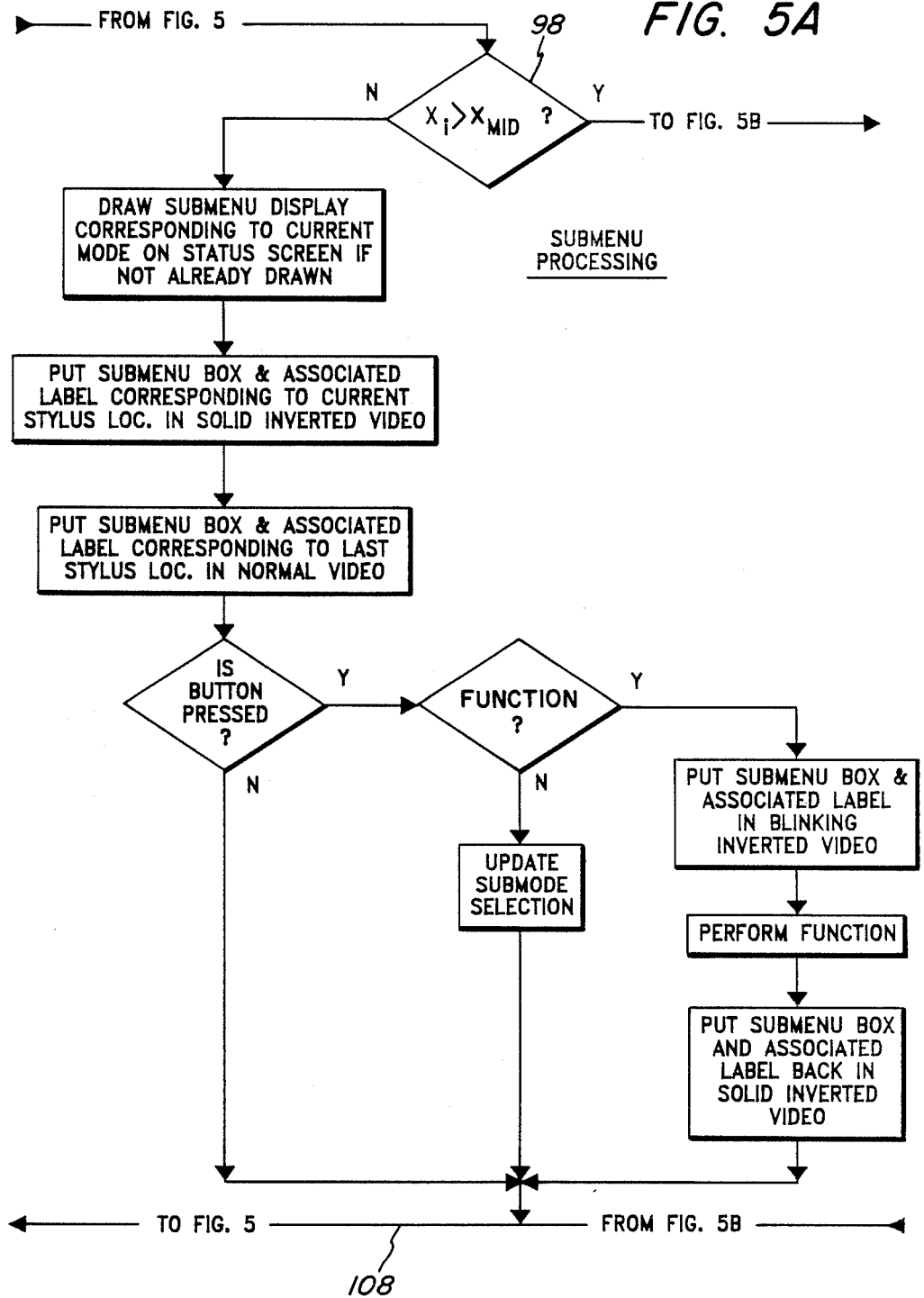

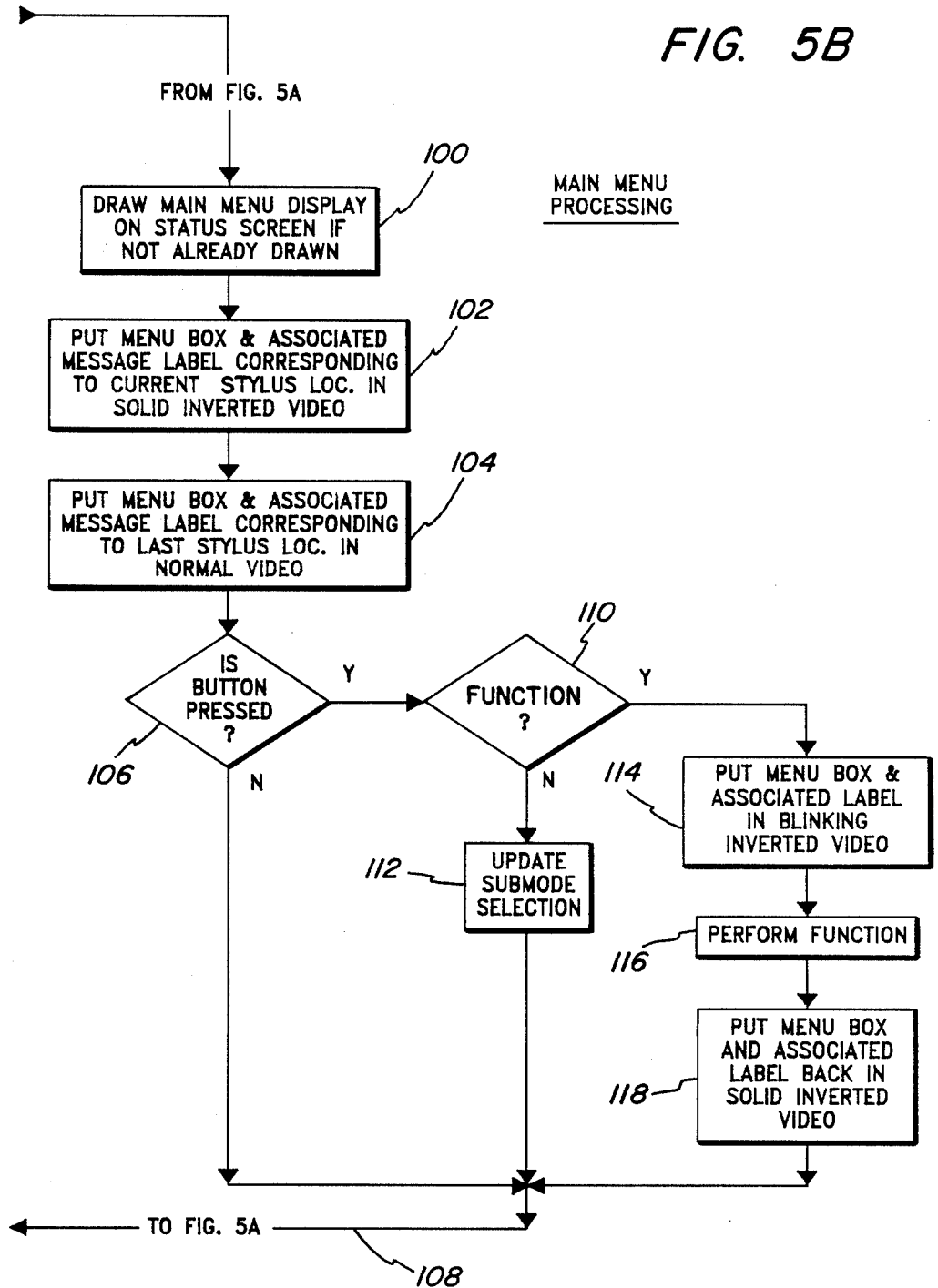

FIG. 7

| Mode # 4-Delete Nodes: | 5 Submenu Choices Available |
|---|---|

Prompt line 1
Prompt line 2
Prompt line 3

Title: Welding Analysis
Analysis Type: 2D/Axi/3D
Thermal/Diffusion/Emag./Fluid Stress   xxx
No. of Timesteps to Run:                xxxxxxx.
Size of Timestep to Run:

No. Completed Timesteps:       xxx
Current Timestep No:           xxx
Size of Current Timestep:      xxxxxxx.
Time from Start of Analysis:   xxxxxxx.

Geometry Status

|  |  | Current Assignments |  |  |
|---|---|---|---|---|
| No. parts: | xxx | (Constrained) | Current Node Temperature: | xxxxxxx. "C" |
| No. nodes: | xxxx | X | Y |  |
| No. elements: | xxxx | xxxxxxx. | yyyyyyy. |  |
| No. materials: | xxx | xxxxxxx. | yyyyyyy. | units |
| No. boundary legs: | xxx | xxxxxxx. | yyyyyyy. |  |
|  |  | xxxxxxx. | yyyyyyy. | units |

Graphic Screen Magnification:
Lower Left Screen Coordinates:
Cursor is at Element: xxxx
Graphic Cursor Position:
Digital Ruler Distance:           dddddd.

DELETE NODES

FIG. 9

| Mode # 14—Assign by Element | | 9 Submenu Choices Available | |
|---|---|---|---|
| Prompt line 1 | | | |
| Prompt line 2 | | | |
| Prompt line 3 | | | |
| No. of Timesteps to Run: | xxx | No. Completed Timesteps: | xxx |
| Size of Timestep to Run: | xxxxxx.xxx | Current Timestep No: | xxx |
| Optimum Timestep to Run: | xxx.xxx | Time from Start of Analysis: | xxxxxxx. |

Geometry Status

| | | | | Assignments | |
|---|---|---|---|---|---|
| | | | | Default | Current |
| No. parts: | xxx | Part Name: | | PART #1 | ELECTRODE |
| No. nodes: | xxxx | Material Name: | | 321SS | COPPER |
| No. elements: | xxxx | Node Temperature: | | xx.xx | xx.xx   Watt |
| No. materials: | xxx | Heat Generation: | | xx.xx | |
| No. boundary legs: | xxx | | X | Y | |
| | | | xxxxxxx. | yyyyyy. | |
| | | | xxxxxxx. | yyyyyy.  units | |
| Graphic Screen Magnification: | | | xxxxxxx. | yyyyyy.  units | |
| Lower Left Screen Coordinates: | | | xxxxxxx. | yyyyyy.  units | |
| Cursor is at Element: xxxx | | | | | |
| Graphic Cursor Position: | | | | | |
| Digital Ruler Distance: | dddddd. | | | | |

ASSIGN BY ELEMENT

SPECIFY BOUNDARY CONDITIONS

FIG. 12

```
Mode # 16  Specify Boundary Conditions        12 Submenu Choices Available

Prompt line 1
Prompt line 2
Prompt line 3

Title: Welding Analysis
Analysis Type: 2D/Axi/3D           xxx        No. Completed Timesteps:          xxx
Thermal/Diffusion/Emag./Fluid Stress xxx      Current Timestep No:              xxx
No. of Timesteps to Run:   xxxx               Size of Current Timestep:         xxxxxxx.
Size of Timestep to Run:   xxxxxx.            Time from Start of Analysis:      xxxxxxx.

Assignments
Geometry Status                               Default              Current
No. parts:        xxx    Radiation Factor:           xx.xxxxx      xx.xxxxx   units
No. nodes:        xxxx   Radiator Temperature:       xx.xxxxx      xx.xxxxx   deg C
No. elements:     xxxx   Heat Transfer Coefficient:  xx.xxxxx      xx.xxxxx   W/m^2 C
No. materials:    xxx    Fluid Temperature:          xx.xxxxx      xx.xxxxx   des C
No. boundary legs: xxx   Applied Flux Density:       xx.xxxxx      xx.xxxxx   W/m^2

X            Y
Graphic Screen Magnification:       xxxxxxx.
Lower Left Screen Coordinates:      xxxxxxx.      yyyyyyy.
Cursor is at Element: xxxx
Graphic Cursor Position:            xxxxxxx.      yyyyyyy.     meter
Digital Ruler Distance:   dddddd.   xxxxxxx.      yyyyyyy.     meter
```

FIG. 15

| Mode # 20–View Analysis Results | | 14 Submenu Choices Available | | |
|---|---|---|---|---|

Prompt line 1
Prompt line 2   View Node Temperature With Digital Thermometer.
Prompt line 3

No. of Timesteps to Run:      xxx            No. Completed Timesteps:       xxx
Size of Timestep to Run:      xxxxxx.        Current Timestep No:           xxx
Optimum Timestep to Run:      xxx.xxx        Time from Start of Analysis:   xxxxxxx.

Geometry Status

|  |  |  |  | Assignments |  |  |
|---|---|---|---|---|---|---|
|  |  |  |  | Default | Current |  |
| No. parts: | xxx | Part Name: |  | PART #1 | xxx |  |
| No. nodes: | xxxx | Material Name: |  | 321SS | xxx |  |
| No. elements: | xxxx | Node Temperature: | xxxxxxx. | xx.xx | xx.xx | deg C |
| No. materials: | xxx | Heat Generation: | xxxxxxx. | xx.xx |  |  |
| No. boundary legs: | xxx | X | | Y | | |

Graphic Screen Magnification:              xxxxxxx.    yyyyyyy.
Lower Left Screen Coordinates:             xxxxxxx.    yyyyyyy.   units
Cursor is at Element: xxxx
Graphic Cursor Position:                   xxxxxxx.    yyyyyyy.   units
Digital Ruler Distance:       dddddd.                  yyyyyyy.   units

VIEW ANALYS RESULTS

DELETE ELEMENTS

FINITE ELEMENT MODELING SYSTEM

BACKGROUND OF THE INVENTION

1. Technical Field

This invention relates generally to computer aided design/computer aided manufacture (CAD/CAM) equipment and more particularly to a Finite Element Analysis system having "intelligent", interactive user interface features which allow engineers without specialized knowledge in mathematical modeling to easily and interactively solve diverse problems.

2. Background Information

Throughout the technological explosion of the last 20 years, industry has found it increasingly necessary to model or predict the results of complex physical processes. Sophistication of product technology and the economics of the mass production process have imposed the requirement for techniques to accurately simulate the physical behavior of manufactured goods both during fabrication and in operation. The ramifications of the ability to fully model industrial processes bear upon each phase in the evolution of a product, resulting in: reduced design costs and time, the ability to design systems that would be prohibitively complex to design without modeling, reduced production costs and increased efficiency, and optimized product performance and life span.

For many years, the equations quantifying the fundamental laws which govern the behavior of matter have been known to scientists. The classical laws of mechanics, heat transfer, fluid mechanics, chemistry and electrodynamics fully describe the interactions which result in the behavior of most physical systems. However, the complexity of the mathematics prohibits solving these equations, by hand, for any but grossly oversimplified situations. For example, the solution of the mathematics describing the real-life situation exactly as posed in the practical world was impossible for such processes as: the drawing of molten tubing into fiber guide, the curing of plastic within the complicated geometry of a mold, the turbulent fluid flow in the internal workings of a pump, and the pressure and stress distributions about the wings and fuselage of aircraft. Hence, classical engineers were forced to resort to crude approximations and simplifications to make the mathematics more tractible. This resulted in the familiar iterative process of design by trial and error, with engineering analysis limited to providing "ballpark" estimates. Prototype development costs were thus phenomenal, and many highly sophisticated products which required "getting it right the first time" were economically unrealizable. Gross product overdesign and poor product performance are predictable results of this mode of operation.

This situation changed drastically with the development and propagation of modern computer technology. Predicated upon the availability of high speed digital computers, a numerical analysis technique called Finite Element Analysis (FEA) was developed. FEA utilizes a method of solution of the basic laws of physics which is unworkable without the capacity for performing many thousands of arithmetic operations each second. The finite element program is capable of in effect "living" the physical situation exactly as it would occur in nature.

FEA is thus able to totally describe the temporal behavior of virtually any system, no matter how complex. For example, a Finite Element Analysis would be capable of providing the stress field and temperature distribution at each point along the surface and interior of the space shuttle during reentry. Not all applications of FEA are equally esoteric. FEA is becoming increasingly popular with automobile manufacturers for optimizing both the aerodynamic performance and structural integrity of vehicles. Similarly, aircraft manufacturers rely upon FEA to predict airplane performance long before the first prototype is built. Rational design of semiconductor electronic devices is possible with Finite Element Analysis of the electrodynamics, diffusion, and thermodynamics involved in this situation. FEA is utilized to characterize ocean currents and distribution of contaminants. FEA is being applied increasingly to analysis of the production and performance of such consumer goods as ovens, blenders, lighting facilities and many plastic products. In fact, FEA has been employed in as many diverse fields as can be brought to mind, including plastics mold design, modeling of nuclear reactors, analysis of the spot welding process, microwave antenna design and biomedical applications such as the design of prosthetic limbs. In short, FEA is utilized to expedite design, maximize productivity and efficiency, and optimize product performance in virtually every stratum of light and heavy industry. This often occurs long before the first prototype is ever developed.

Finite Element Analysis derives its name from the manner in which the geometry of the object under consideration is specified. Basically, the FEA program must be provided with a "picture" of the geometric situation and a description of the properties of the material at each point within the picture. In this picture, the geometry of the system under analysis is represented by quadrilaterals and triangles of various sizes, which are called elements. The vertices of the elements are referred to as nodes. The mesh is composed of a finite number of elements (500–5,000 elements being typical). The mesh thus represents the physical space occupied by the object under analysis along with its immediate surroundings. The FEA program is informed of the composition of each element by assigning each element a material name. The program then refers to a table wherein the fundamental properties (such as thermoconductivity or electrical resistivity) of each material type is tabulated. Additionally, the conditions at the boundary of the object (i.e. radiation, convection, etc.) must be specified. In this fashion a model of the object and its environment is created. The model can then be processed by a computer using available Finite Element Analysis programs to simulate the effects on the object of a specified physical process.

The results of a Finite Element Analysis are most easily interpreted graphically. A particularly efficacious method is to superimpose isopotential lines (such as isopressure lines in a weather map or equilatitude lines in a topographical map) upon the basic geometry of the situation. For example, in viewing the thermal distribution within a system, lines connecting areas of equal temperature can be superimposed upon the model. The analyst can view successive time frames in this manner for an explicit pictorial representation of the evolution of the situation. For example, the temperature distribution at each point throughout an initially cold light bulb from the instant it is turned on until the temperature stops changing can be meaningfully illustrated in just such a manner.

For further detailed information on the FEA method, reference may be had to the text "State-Of-The-Art Surveys On Finite Element Technology" published by the American Society of Mechanical Engineers, 1983, the numerous publications cited therein, or other available literature on this subject.

Presently a Finite Element Analysis is an extremely formidable task to perform, usually not achievable by an engineer or scientist with ordinary skill in his area of expertise. Only a relatively small, select group of highly trained professionals, typically with PhD's in engineering or applied mathematics and additional years of direct experience with FEA are able to effectively utilize the technique. Such individuals must understand the intricacies of both the mathematics upon which FEA is based and the practical implementation of FEA. Even for those with the highly specialized training necessary to perform FEA, the technique is often cumbersome and labor intensive. A single analysis may require weeks to months of professional effort to complete. As a result, FEA has generally been confined to very large organizations which can afford to hire individuals specializing in FEA. Even in such large organizations, FEA is restricted mostly to the research and development centers and usually utilized only for the most pressing applications. The current situation is directly analogous to that which existed in the earliest days of the computer, when the application of a computer to a specific task required a uniquely trained individual to laboriously generate the program in machine language itself.

Currently there exists a dichotomy between systems which perform the actual finite analysis calculations and those which allow the user to enter the information necessary for analysis and to view the results. The latter is known as "CAD/CAM" systems while the former are referred to as "number-crunchers". Typically a user will create a model on a CAD system, transmit the information to a number-cruncher, run the analysis on the number-cruncher, transmit the results back to the CAD system and utilize the CAD system to view the results. The process must be repeated each time the user wishes to modify the model. Many problems are inherent to such fragmentation of the modeling process. Additionally, both the CAD systems and the number-crunchers impose individual barriers to effective modeling.

A major obstacle to performing Finite Element Analysis on existing systems lies in the user interface employed to provide the finite element program with information about the situation to be modeled and to interpret the results which the FEA program returns. In order to generate the proper program input to the FEA program with existing CAD systems, a user must be cognizant of the many nuances intrinsic to the technique. For example, the order in which the nodal points are specified can impact dramatically upon the amount of computer time necessary to perform the analysis. The user must develop an intuitive feeling for the physics of the situation in order to tailor the size of the elements to the gradients expected within them. Further, the analyst must develop an intimate familiarity with the details of the structure of the input file to the FEA program. Often, much or all of the input file is generated by manually entering numbers into the computer. The potential for specifying erroneous information is high and existing programs do not detect such errors as overlapping or undefined elements. Automatic model generation systems are available but these are designed primarily for applications other than FEA and generate models which are difficult to modify. After the analysis is performed, the results must be interpreted, which can involve combing through dozens of pages of computer printouts consisting of tables and numbers. In short, in addition to requiring specialized knowledge, existing interfaces make the data inputting and results interpretting operations of FEA extremely tedious and time consuming.

Currently there is no user interface system known to applicants specifically designed to support Finite Element Analysis model creation and results display. There are several commercially available CAD systems which offer some FEA support, but these all have severe limitations which curtail their usefulness. First, the available systems are powerful, generalized graphics systems which are designed mainly for integrated circuit, printed circuit board and drafting applications. FEA support packages are available secondary to the primary function of these systems. Second, these systems are usually extremely expensive even for a minimal system. Third, the finite element support packages which are available in these systems are extremely complicated to learn how to use. Expert personnel require extensive training to become facile with the use of these systems. Fourth, most of these packages do not allow specification of the complete input file for the analysis, so after using the support system the analyst must still massage the input file by hand. Fifth, few of these FEA support packages adequately provide for display of the results of the analysis. Sixth, extensive expert labor is often required to convert the files generated by these support systems to the format required by the user's FEA program and to convert the output of the FEA to a format acceptable to the support system. Users are thus forced to write their own programs to compensate for the deficiencies in the commercially available systems and as a result FEA is shrouded by mystique and often viewed as a "black art".

Commercial programs which perform the mathematics of the FEA process are available for use on a rental or a license basis. There are also several programs which are in the public domain. Thus it is not necessary for the end user to write his own Finite Element Analysis program. However, most of these programs are constrained to run on main frame or large mini computers which are priced far beyond the means of many potential users. Such number-crunchers are often operated in a time sharing mode which can result in long delays in analysis turnaround. Most large systems are not physically near the user who must communicate at low data transmission rates.

A few microcomputer based FEA systems have been developed. However, these generally comprise miniaturized versions of the main frame systems, exhibit limited processing and interactive capabilities, and require extensive training before they can be successfully operated.

A need thus exists for a Finite Element Analysis system which overcomes the limitations discussed above and is, in every sense, "within reach" of the ordinary engineer.

SUMMARY OF THE INVENTION

The present invention satisfies this need by providing a powerful, economical, fully integrated, and simple to use Finite Element Modeling system which allows engineers without specialized knowledge in mathematical modeling to easily and interactively solve practical problems in heat transfer, diffusion, electromagnetics, stress, etc. By virtue of the unique user interface features and data processing structure of this invention, the Finite Element Analysis technique is, for the first time, made readily accessible to any engineer.

The highly interactive "intelligent" interface system of the present invention provides the design engineer with a versatile and powerful tool for simply and expeditiously creating the input necessary to perform FEA, and for pictorially displaying the resultant information in a succinct, physically meaningful fashion. The system is easy to use, and is no more difficult to learn than a new video game. A designer with no knowledge of the workings of Finite Element Analysis and no prior experience with the system can walk up to the machine denovo, learn how to use it without even referring to a manual, and effortlessly and rapidly solve the problem at hand.

More particularly, with the aid of a specially segmented digitizer tablet, the user of the Finite Element Modeling system of the present invention may select among various available processing modes from a menu, and enter pictorial data. With system prompts every step of the way, the finite element model literally evolves before the user's eyes on the screen of a graphics display. Unique "intelligent" cursors which automatically appear on the graphics screen guide the user during model creation and modification operations. Depending upon the processing mode selected by the user, the intelligent cursor is automatically positioned at a particular site of interest nearest the current location of a dumb cursor controlled by the user. The intelligent cursor anticipates the user's action in the selected mode, constrains user input to valid operations within that mode and provides unambiguous visual feedback to the user of the site selected.

The shape of the intelligent cursor preferably varies with different processing modes so as to provide an indication of the particular mode selected by the user. A proximity tolerance may be assigned to sites of interest in a particular mode such that the dumb cursor must come within a specified proximity of the nearest site of interest before an intelligent cursor appears at that site. In an Enhanced View Analysis Results mode, several different intelligent cursors may be simultaneously displayed on the graphics screen.

For each mode, a corresponding status display is presented on the status screen of an alphanumeric display device when the user is operating in that mode. Information in the status display is updated in real time in accordance with the current location of the intelligent cursor on the graphics screen.

The status screen serves a dual purpose providing not only real time information about the mode the user is currently in but also displaying menus for user selection of desired processing modes. The presentation on the status screen is specially correlated with user input through the digitizer tablet. The tablet has a surface divided into a graphics workspace and a menu region. The user manipulates a stylus (or other pointing means) to different locations on the tablet surface in order to make a menu selection or undertake a mode specific operation. The tablet outputs a position signal identifying the current location of the stylus. A computer determines from the position signal whether the stylus is in the graphics workspace or menu region, and controls, in real time, the alphanumeric display device to provide a menu display on the status screen, when the stylus is in the menu region, and to automatically substitute a mode-dependent status display for said menu display when the stylus enters the graphics workspace. The user is thus provided with the information he needs for a particular contemplated action before the action is undertaken.

The menu region of the digitizer tablet may include a main menu area and a submenu area. The computer determines whether the stylus is in the main menu area or the submenu area and controls the menu display accordingly. In either menu area, modes pointed to by the stylus are highlighted on the status screen and modes actually selected by the user are identified. The user is thereby provided with direct unambiguous feedback of his mode selecting actions.

By automatically switching the display on the status screen in correspondence with stylus movement into a different area of the digitizer tablet, the present invention not only anticipates and correlates the display to the user's actions but also limits the information presented to that which the user currently needs, while concurrently taking full advantage of the total space available on the status screen.

In addition to relieving the tedium and removing the mystique presently associated with creating finite element models, the Finite Element Analysis system of the present invention eliminates the formidable obstacle associated with coupling to a remote computer system upon which the FEA is performed. According to the present invention, all analysis may be performed upon the same apparatus which is used to create the model and display the results. This eliminates time consuming file transfer and allows the analyst to change the properties of the model and have results quickly available. In short, the Finite Element Modeling system of the present invention allows any engineer to accomplish in hours what currently takes a specialist many weeks to perform. The total system costs are considerably less than for either a CAD system or a number-cruncher, eliminating the prohibitive financial barrier presented by currently available FEA systems.

Accordingly a principle object of the present invention is to provide a user friendly Finite Element Modeling system which will allow the average engineer to take advantage of the Finite Element Analysis technique.

Another object is to provide such a system which significantly simplifies and expedites the Finite Element Modeling process and which makes the FEA technique universally available to engineers.

Another object is to provide such a modeling system which overcomes the previously described limitations of existing FEA systems.

A further object is to provide such a system that has enhanced, interactive user interface features, that guide the user in real time in the effective operation of the system, that reduce input errors, and that minimize the number of interactions required in forming and modifying a FEA model.

Yet another object is to provide such a system which anticipates the actions of the user, automates much of the model creation and modification operations and facilitates rapid solution of problems in diverse fields.

Still another object is to provide such a system which is usable without extensive training, affordable, packagable as a fully integrated, stand alone unit, and is otherwise totally "within the reach" of the average engineer.

A still further object is to provide such a system which is simple to learn to use, can run on a microcomputer and yet provides a powerful analytical tool for solving practical problems by an ordinary engineer.

BRIEF DESCRIPTION OF THE DRAWINGS

These and other objects, features and advantages of the present invention will be more fully understood from the following detailed description read in conjunction with the accompanying drawings in which:

FIG. 5A is a flow chart of the submenu processing of the present invention;

FIG. 5B is a flow chart of the main menu processing of the present invention;

FIG. 7 illustrates a status display associated with a Delete Nodes mode;

FIG. 9 is an example of a status screen display for a main mode entitled "Assign By Element";

FIG. 12 is an exemplary status display for a Specify Boundary Conditions mode;

FIG. 15 is a representative status display for a View Analysis Results mode;

DETAILED DESCRIPTION

Figure 1:
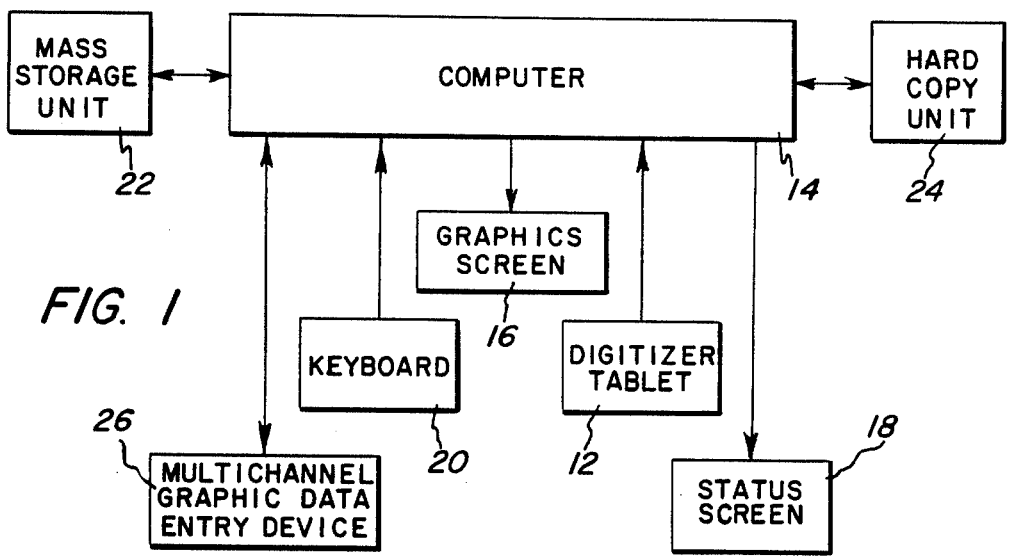
FIG. 1 is a general block diagram of one embodiment of the present invention.

FIG. 1 is a hardware block diagram illustrating a preferred embodiment of the Finite Element Modeling system of the present invention. The system includes a digitizer tablet 12, specially designed as more fully discussed below, to allow a user to enter pictorial data and make menu selections. The output of digitizer tablet 12 is transmitted to a computer 14 which performs the processing associated with the system. This processing will be described subsequently with respect to FIGS. 4, 5, 5A and 5B.

Computer 14 controls the display on a graphics screen 16 of a high resolution graphics terminal and the display on a status screen 18 of an alphanumeric terminal. As more fully discussed hereinafter, the graphics screen 16 is used to display the model, analysis results and various cursors. Status screen 18 alternatively presents menu displays indicative of processing modes available for user selection and mode-dependent status displays. The status screen 18 automatically switches between appropriate menu displays and status displays to provide the user with the information he needs to undertake a contemplated action.

Figure 3:
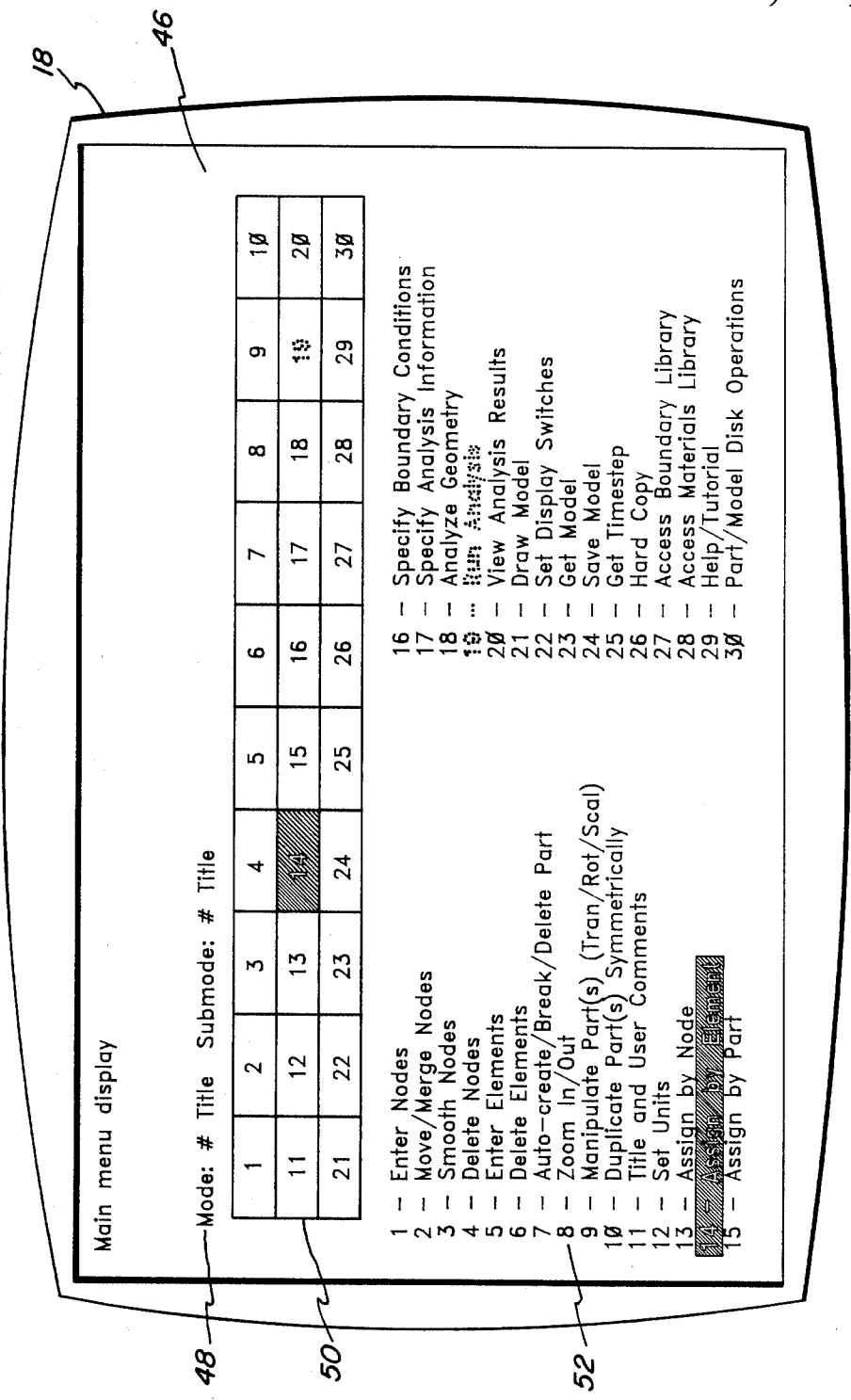
FIG. 3 is an example of a main menu display on the status screen of the present invention.
Figure 6:
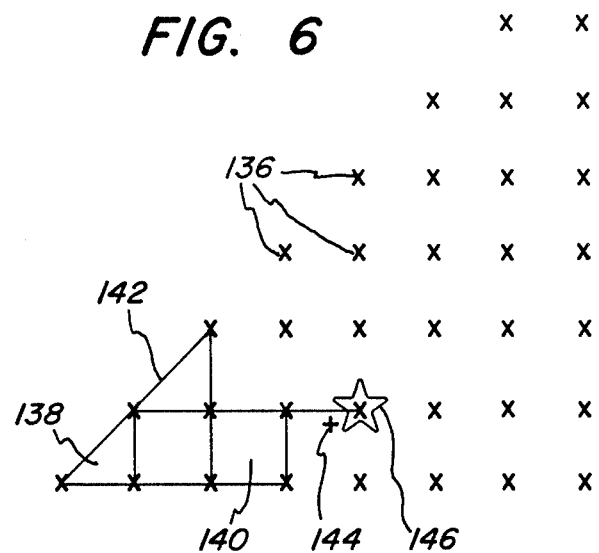
FIG. 6 is a diagram useful in understanding the model creation process of the present invention.
Figure 10:
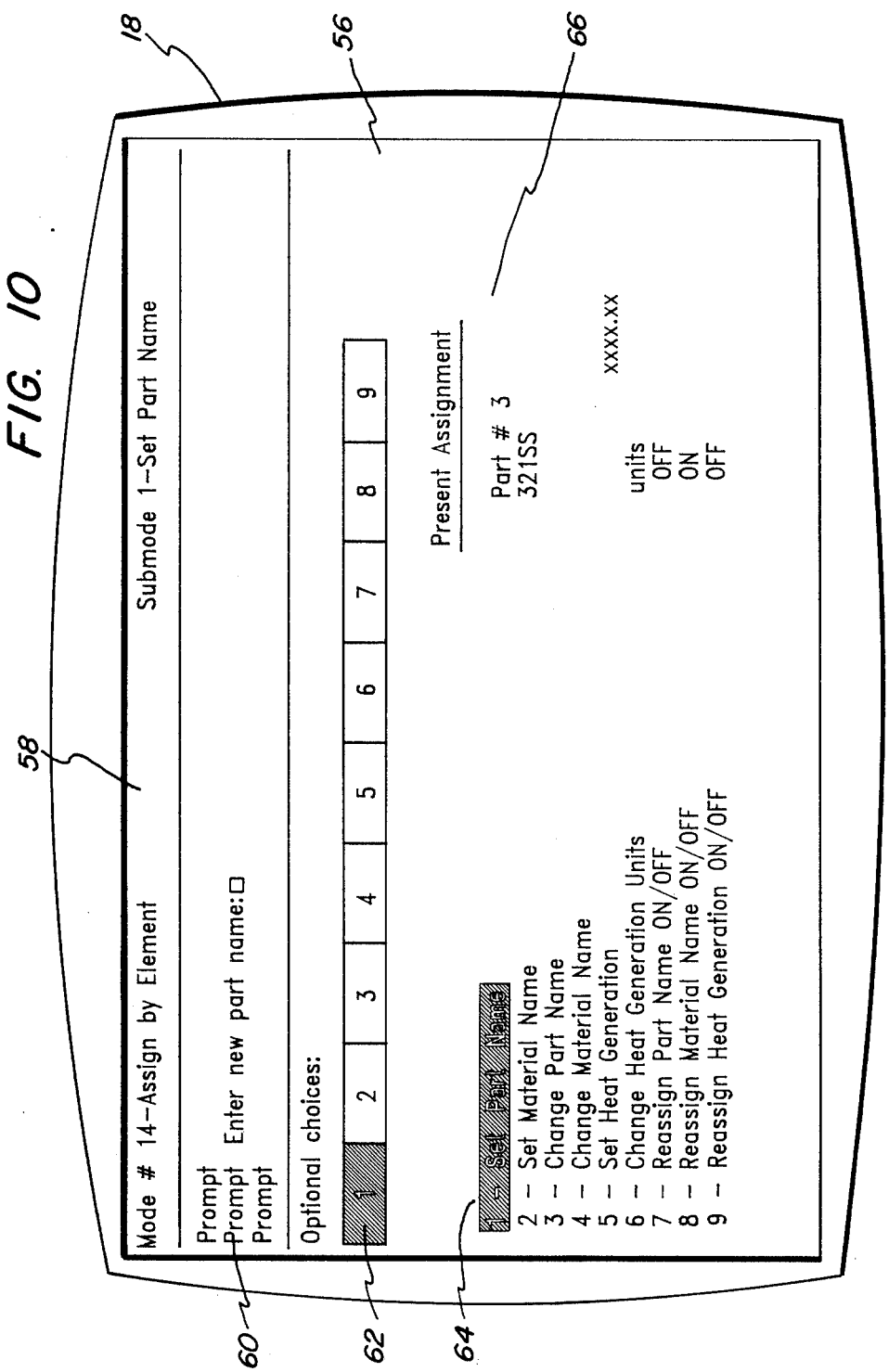
FIG. 10 illustrates a submenu display associated with an Assign By Element mode.
Figure 13:
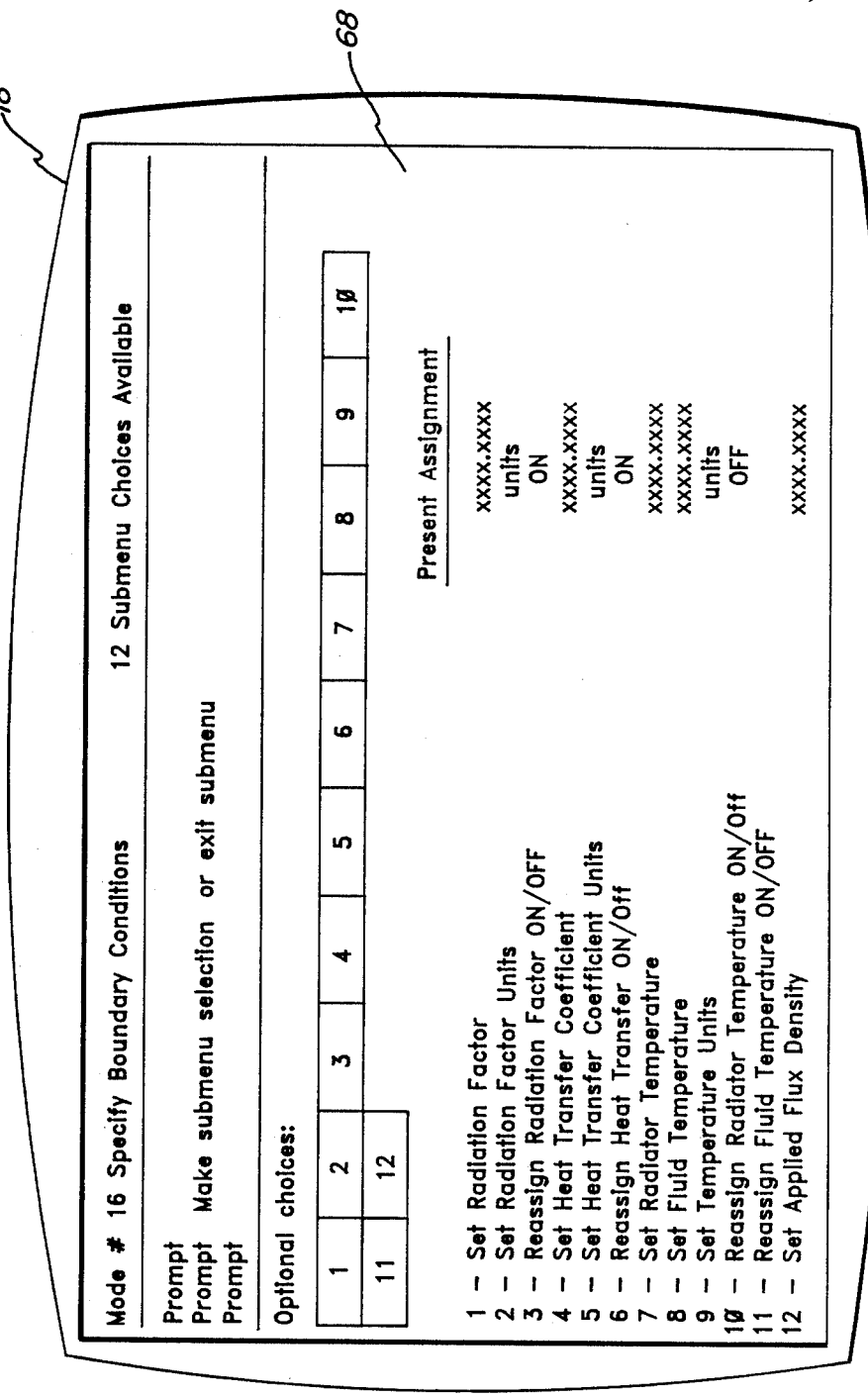
FIG. 13 illustrates a submenu display for a Specify Boundary Conditions mode.
Figure 16:
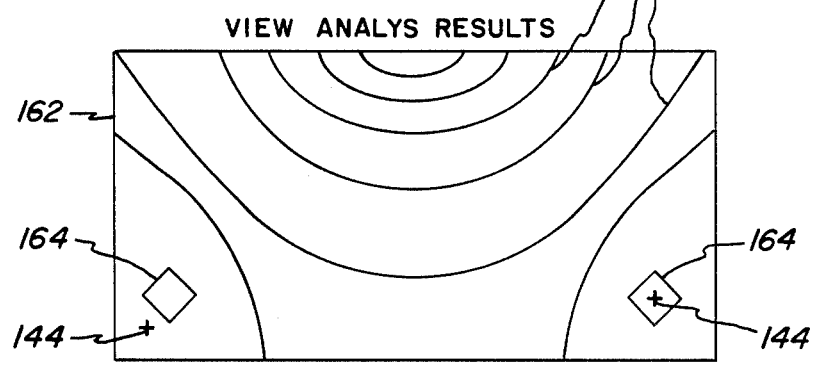
FIG. 16 is a simplified depiction of intelligent cursor positioning on a graphics screen in a View Analysis Results mode.

The nature of the displays themselves and the information included in the displays, on both screens, are updated in real time by computer 14 to reflect user inputs and the intelligence/data structure of the system. FIGS. 6 and 16, depict the types of graphical presentations that might appear on graphics screen 16 during model creation and analysis viewing, respectively. FIGS. 3, 10 and 13 illustrate typical menu displays which might be presented on status screen 18; FIGS. 7, 9, 12 and 15 depict status displays for different modes which might appear on status screen 18 while mode processing is occurring.

The four hardware components described so far comprise the basic elements of the Finite Element Modeling system of this invention. However, various other peripheral devices may also be advantageously employed in the system. As shown in FIG. 1, these could include a keyboard 20 for entering alphanumeric data, a mass storage unit 22 for storing a model for later use, a hard copy unit for making paper copies of the graphics screen displays, and a Multichannel Graphic Data Entry Device 26. The latter is an optional data input device which can be advantageously employed as an alternate submenu selection system, or to enter data in the form of a curve, e.g. coefficients of a polynomial expansion, or to enter other variable parameter values. A suitable device for this purpose is described in the patent application Ser. No. 774,083 of Robert K. Cohen entitled "Multichannel Graphic Data Entry Device For Interface With A Computer". The keyboard could be any of the many currently available separate keyboards or one associated with a terminal, e.g. the graphics terminal. The mass storage unit could be any conventional hard disk or floppy disk unit, e.g. a Shugart 850 floppy disk unit. Likewise the hard copy unit can be any commercially available plotter, e.g. a Gould Colorwriter 6120. Such peripheral devices are useful complements but are not essential to the successful operation of the invention and accordingly are discussed no further.

Digitizer tablet 12 and the terminals which implement the graphics screen and status screen are preferably "intelligent", although it is possible to have the intelligence required to operate these input/output devices reside in the computer, e.g. by using a special video board in the computer in conjunction with a television type monitor. By way of example, the graphics terminal might be a Tektronix 4107 computer display terminal which comes with an associated keyboard, the alphanumeric terminal could be an Amdek 300A video display monitor, and the digitizer tablet could be a Summagraphics Bit Pad One. Of course, other equivalent hardware could be used. Also the status screen could be implemented with the same terminal as the graphics screen, e.g. by reserving a particular portion of the screen of the graphics terminal for this purpose.

In the presently preferred embodiment, computer 14 is a microcomputer, e.g. an IBM Personal Computer or a Zilog Z-80 based microcomputer. This allows the entire system to be packaged as a stand alone engineering workstation. Alternatively, the computer could be a physically separated processor, preferably operating in a mode such that the communication linkage is transparent to the user. A hybrid situation is also possible where the computer comprises a microcomputer connected to a high performance processor. No matter what form the computer takes, it preferably performs the interface and mode processing described hereinafter as well as the Finite Element Analysis itself; although, even this integration of processing is not absolutely necessary.

Before further discussing the details of the present invention, it is useful to note that although a complete Finite Element Analysis system has been developed, this description focuses primarily on the novel user interface aspects. Though readily extendable to three-dimensional modeling systems, for the sake of simplicity of discussion, the ensuing description is in terms of a two-dimensional model. Likewise, although the system is applicable to solving problems in diverse fields, the examples used herein are drawn from the field of heat transfer.

Figure 2:
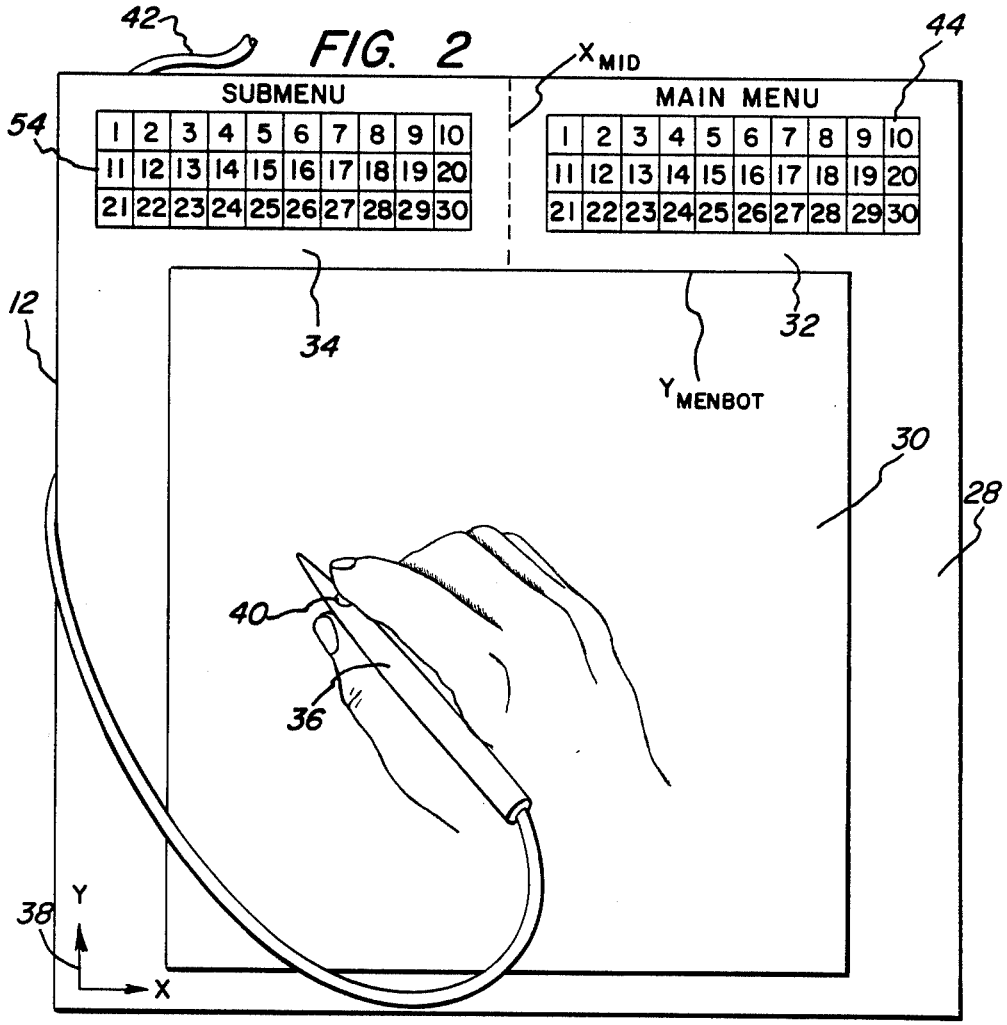
FIG. 2 is a top plan view of a digitizer tablet useful in the present invention.

Digitizer tablet 12, shown in greater detail in the top view of FIG. 2, provides a preferred unitary vehicle for menu selection and pictorial data entry. Tablet 12 is provided with an overlay 28 which divides the work surface of the tablet into a graphics workspace 30 and a menu region consisting of main menu area 32 and submenu area 34. The boundary between the graphics workspace 30 and the menu region is defined by a line labeled $Y_{MENBOT}$. The main menu area 32 and submenu area 34 are separated by a boundary line labeled $X_{MID}$.

Tablet 12 also includes a stylus 36, or other user manipulable pointing means, for designating different locations on the tablet work surface. The location of stylus 36 can be identified by conventional x and y coordinates along orthogonal directions as indicated at 38. The stylus which may be an electronic pen, mouse or other known pointing means includes a button 40 which the user can press to signify the making of a selection. Signals representative of the current location of the stylus 36 and the status of button 40 are conveyed to computer 14 via cable 42.

The graphics workspace 30 is used to enter pictorial data, i.e. for model creation and editing, analysis results interpreting, etc. The location of stylus 36 is tracked by a dumb cursor on graphics screen 16, as more fully discussed hereinafter. Simultaneously information in a mode-dependent status display on status screen 18 is updated to reflect the current stylus location in graphics workspace 30.

Main menu area 32 on the tablet surface is reserved for selecting main menu options (i.e. main modes and functions) from a main menu 44 consisting of a plurality of discrete labeled locations corresponding to different main menu options. In the example illustrated, thirty boxes corresponding to thirty different main menu options are employed.

When stylus 36 enters main menu area 32 from graphics workspace 30, a main menu display 46 (see FIG. 3) is automatically substituted for the status display on status screen 18. In the preferred embodiment, main menu display 46 includes an area 48 for indicating the current mode and submode selections of the user, a menu presentation 50 corresponding to the main menu 44 on the digitizer tablet, and an area 52 identifying the main modes and functions associated with the different menu options.

As the user positions stylus 36 over different boxes in main menu 44, the corresponding menu option box in menu presentation 50 and the associated message label in area 52 of main menu display 46 are highlighted. In one embodiment of the invention, stylus position within the menu is reflected by displaying the corresponding menu option box and associated message label in the menu display, in inverted video. For illustrative purposes, in FIG. 3, main menu option 14 and the associated message label are shown highlighted.

The main menu options include various processing modes and functions useful in Finite Element Modeling and Analysis. The invention distinguishes between modes and functions. A mode generally requires further user input through the graphics workspace of the digitizer tablet; while a function requires no further interaction and is automatically performed when selected by the user. Main menu option 19-Run Analysis is an example of a function. When selected by the user option box 19 and the associated message label in menu display 46 may be presented in blinking inverted video, as schematically illustrated in FIG. 3. When the system completes performance of the function, the corresponding menu box and message label is returned to solid inverted video. Of course, other schemes to unambiguously identify to the user the menu option corresponding to the current location of the stylus and to distinguish between a processing mode and a function may be employed. Likewise, the layout, option identification scheme and message labels may vary from those shown in FIG. 3. The use of the status screen 18 exclusively for menu display when the stylus is in the menu region of the digitizer tablet, is advantageous in that it allows message labels for all available menu options to be listed. As an alternative, should the number of menu options become very extensive, only the message label corresponding to the current location of the stylus could be displayed.

Area 48 of main menu display 46 indicates to the user the last mode and submode selected by the user. By pressing stylus button 40 when the stylus is pointing to a particular mode in the main menu 44, the user selects that particular mode and area 48 on the menu display is updated to reflect selection of the new mode. When a function is selected, area 48 displays the function being performed and after completion of the function, area 48 reverts to indicate the last mode selected. Further details of main menu processing are discussed hereinafter with reference to FIG. 5B.

Referring back to FIG. 2 it will be seen that submenu area 34 contains a submenu 54 similar to main menu 44. The boxes of this submenu and identification information like that for the main menu 44, are actually printed on overlay 28 which may, for example, be made of clear acetate.

When the user moves stylus 36 into submenu area 34, a submenu display corresponding to the current system mode is displayed upon the status screen. In one embodiment of the invention, most of the 30 main modes have a unique submenu associated therewith. As with the operation of the system in connection with the main menu area, transition of stylus 36 into submenu area 34 from either the graphics workspaces or main menu area 32 automatically results in replacement of the prior display on the status screen with a mode-dependent submenu display.

FIGS. 10 and 13 illustrate typical submenu displays for two different main modes. In FIG. 10, a submenu display 56 for main mode #14-Assign By Element is depicted. Submenu display 56 includes a heading area 58 for identifying the corresponding main mode and any selected submode, a prompting area 60 for providing appropriate instructions to the user, a menu presentation area 62 containing submenu option boxes equal in number to the number of submodes and functions available in the particular submenu, an area 64 containing message labels identifying the various submenu choices, and an area 66 which may contain additional submode specific information. In a manner similar to that earlier described with respect to the main menu display, the submenu display on status screen 18 identifies the submenu choice corresponding to the current location of the stylus, distinguishes between submodes and functions, and identifies the last submode selected by the user. For example, in FIG. 10, the highlighting of option box #1 and the associated message label (e.g. by displaying these in inverted video) indicates that the stylus is currently pointing to this submenu choice; the title area 58 indicates that submode 1 has been selected by the user, while prompting area 60 provides instructions to the user concerning the next step to be taken.

The submenu display 68 of FIG. 13 is similarly formatted. Note that this time twelve submenu boxes are displayed corresponding to the number of submodes and functions available in this particular main mode. Before a selection is made, the heading area preferably indicates the number of submenu choices available. Further details of the submenu processing performed by computer 14 is depicted in flow chart form in FIG. 5A.

So long as stylus 36 remains in the main menu area 32 of the digitizer tablet, the main menu display 46 of FIG. 3 remains on status screen 18 and the user may make a new main menu selection. Movement of stylus 36 from main menu area 32 to submenu area 34 causes replacement of the main menu display by a submenu display corresponding to the last main mode selected by the user. Likewise movement of the stylus from main menu area 32 into graphics workspace 30 normally results in substitution of a mode-dependent status display for the main menu on status screen 18. However, some of the main modes may have forced submenus associated with them. When such a main mode is selected, the associated forced submenu will appear on the status screen regardless of whether the stylus is in the graphics workspace or in the submenu area. Once the appropriate submode selections from the forced submenu have been completed, the appropriate status display will be presented on the status screen when the stylus is moved into the graphics workspace.

By using a single status screen to alternately present the main menu, submenu and status displays, an obvious economy of hardware is realized. Moreover, the user is provided with only the information he needs for the action about to be undertaken (i.e. a menu option selection or pictorial data entry). The total status screen is available to provide the relevant information. Furthermore the user's actions are anticipated by automatically providing an appropriate display, in real time, in correspondence with the user's contemplated actions as reflected by stylus movement.

After selecting a desired main mode from the menu, the user would normally move the stylus into the graphics workspace of the digitizer tablet and a status display corresponding to the selected mode will automatically be presented on status screen 18. FIGS. 7, 9, 12 and 15 illustrate typical status displays for different main modes. Referring, for illustrative purposes, to FIG. 9, it is seen that status display 69 typically includes a heading area 70 identifying the main mode and number of submenu choices available in that mode; a prompting or instruction area 72, an area 74 containing information relating to the nature and state of the analysis; an area 76 relating to the current geometry status of the model; an area 78 indicating current and default assignments pertinent to the mode the system is curently operating in; and an area 80 providing information relating to the graphics screen and the position of an intelligent cursor on the graphics screen. The status screen displays and continually updates in real time the current assignments pertinent to the mode (which are dependent upon the position of the intelligent cursor), and the positional information concerning the intelligent cursor. When the stylus is in the graphics workspace of the digitizer tablet and the user depresses the button on the stylus, mode specific action is taken (i.e. a node or element may be added, deleted, or have its properties updated). The status screen is updated to reflect this action. The actions undertaken in several representative modes are discussed subsequently.

User action in the graphics workspace is reflected not only on the status screen but also on graphics screen 16. The graphics screen graphically displays the current model, with nodes depicted as "X"'s (See FIG. 6), elements depicted by lines interconnecting the nodes, field values depicted by isolines (e.g. temperature with isotherms-see FIG. 16), and flux lines depicted similarly. Additional information such as node and element numbers, material names, part names and boundary conditions may be superimposed on the basic model. Also displayed on the graphics screen is a dumb cursor depicted by a small "+". The location of the dumb cursor on the graphics screen corresponds to the physical position of the stylus in the graphics workspace and is updated in real time. A mode-specific intelligent cursor (discussed more fully hereinafter), also appears on the graphics screen at the nearest site of interest, i.e. about the closest node or boundary segment or within the element in which the dumb cursor is located.

As the user moves the stylus in the graphics workspace, the dumb cursor is relocated on the graphics screen accordingly and the intelligent cursor continually and automatically jumps to the nearest site of interest to the current location of the dumb cursor. Also the real time items on the status screen are continually updated. When the user initiates a mode-specific action by depressing the button on the stylus, the status screen and graphics screen are both updated to reflect this action.

Figure 4:
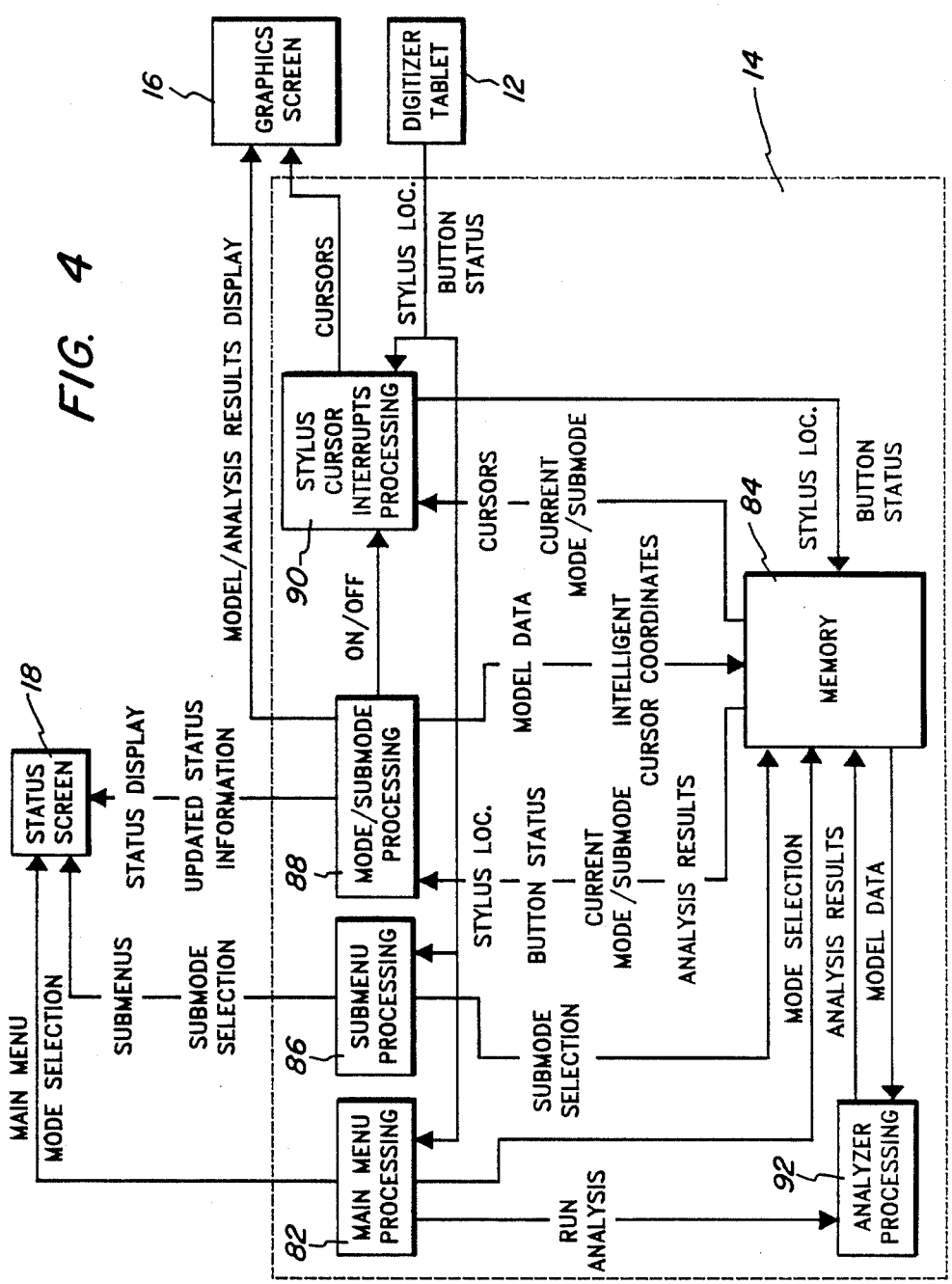
FIG. 4 is a simplified block diagram useful in understanding the operation of the computer processor of the present invention.
Figure 5:
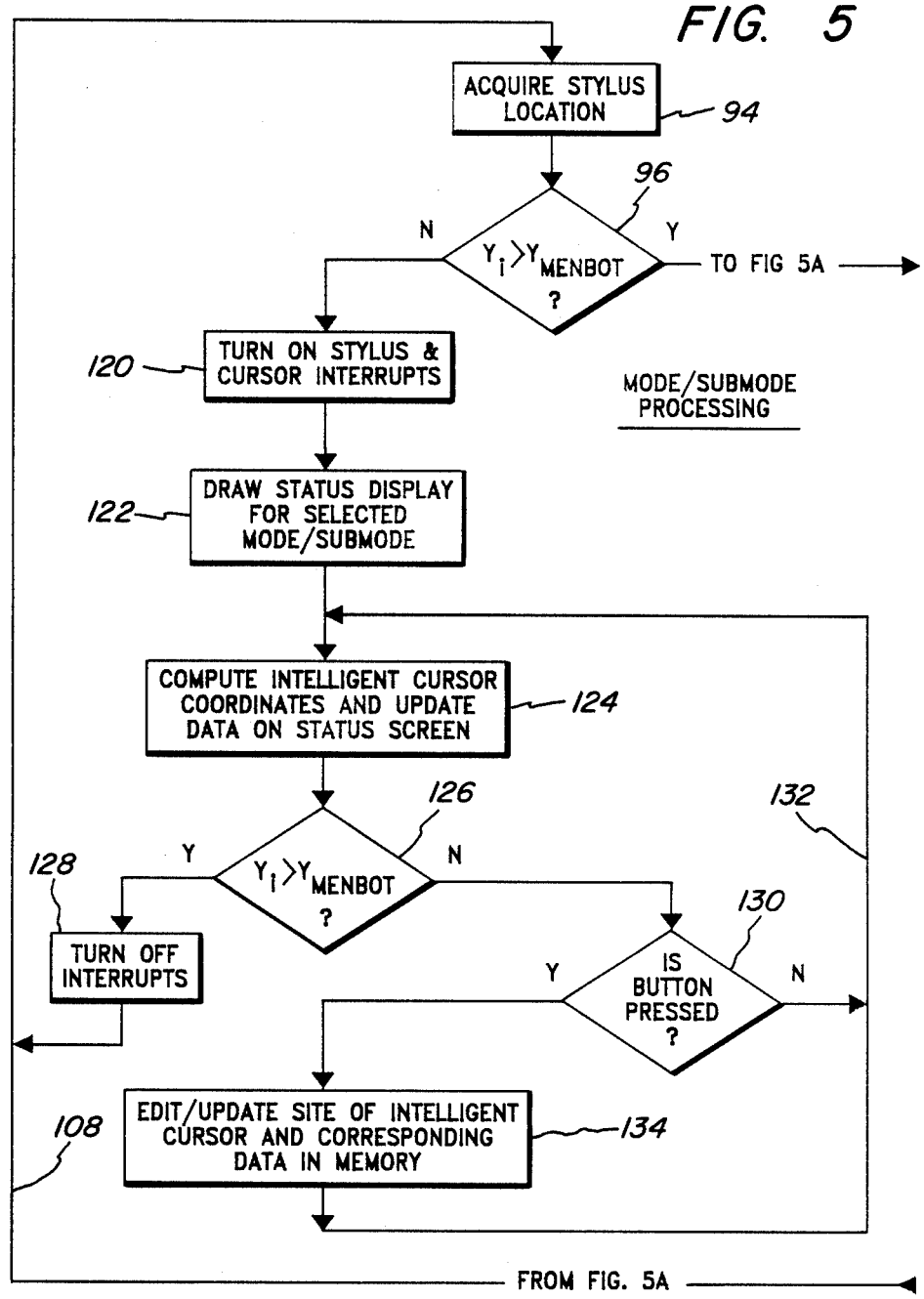
FIG. 5 is a flow chart of the mode/submode processing of the present invention.

The operation of computer 14 which performs the processing for the Finite Element Modeling system of the present invention will now be discussed with reference to FIGS. 4 and 5. FIG. 4 depicts in functional block diagram form the major processing components and the flow of information between these components and digitizer tablet 12, graphics screen 16 and status screen 18. The main menu processing performed by computer 14 is represented by block 82 in FIG. 4. As previously described and as illustrated in FIG. 5B discussed hereinafter, main menu processing involves detecting and tracking stylus movement in the main menu area of the digitizer tablet, drawing the main menu display on the status screen 18, highlighting the menu box and associated message label corresponding to current stylus location, and updating the current main mode when a selection is made by the user. These objectives are accomplished by monitoring stylus location and button status from digitizer tablet 12 and providing appropriate instructions to status screen 18. An indication of the current main mode is also provided to memory 84. Main menu processing will be described in greater detail later with respect to FIG. 5B.

Submenu processing, represented by block 86 in FIG. 4, operates in a fashion substantially identical to main menu processing to provide a mode-dependent submenu on status screen 18, to highlight the current submenu box and associated message label corresponding to current stylus location, and to indicate the current submode selection on the status screen as well as in memory 84. A flow chart of typical submenu processing is depicted in FIG. 5A.

Computer 14 also performs mode/submode processing as represented by box 88 in FIG. 4. The particular processing performed depends, of course, on the particular mode/submode selected. The processing occurs when the stylus is located in the graphics workspace of the digitizer tablet. In general, this processing involves inputting stylus location, button status, current mode/submode and analysis results from memory 84. The outputs of mode/submode processing include the drawing of the appropriate status display on status screen 18, the updating in real time of the status information in the status display, the graphical depiction of the model and/or analysis results on graphics screen 16, and the transfer of model data and intelligent cursor coordinates to memory 84. Model data preferably includes node, element and boundary segment information (i.e. location and interconnections, number, and physical properties of each). Analysis results preferably includes just nodal information. The intelligent cursor coordinates are computed in mode/submode processing, based upon current stylus location as reflected by dumb cursor location in relationship to the location of sites of interest in the particular mode/submode. The intelligent cursor is located at the nearest site of interest to the current location of the dumb cursor. Sample methods of computing the nearest site of interest are discussed subsequently. A flow chart depicting the particulars of mode/submode processing is shown in FIG. 5.

Mode/submode processing also preferably controls stylus/cursor interrupts processing, represented by block 90 in FIG. 4. This processing is preferably independent of the other processing performed by computer 14. Stylus/cursor interrupts processing, when activated by mode/submode processing, continually polls, in real time, (e.g. at a rate of 30 interrupts per second) digitizer tablet 12 to determine current stylus location and button status. The interrupts processing simultaneously draws the dumb cursor and intelligent cursor on graphics screen 16. The interrupts processing also provides current stylus location and button status to memory 84 and receives therefrom current mode/submode information as well as positional information relating to the cursors. From the current mode/submode information the cursor interrupts processing, determines the shape of the intelligent cursor. As indicated earlier the coordinates of the intelligent cursor are determined by mode/submode processing.

In the preferred embodiment, computer 14 also performs the Finite Element Analysis processing as indicated by block 92 in FIG. 4. The analysis, which is initiated by user selection of the Run Analysis function in the main menu, operates upon model data from memory 84 to provide analysis results back to memory 84. As indicated earlier, various programs are commercially available to implement FEA processing. The analysis may, of course, be performed in a processor separate from computer 14. Memory 84, in addition to the parameters already discussed and illustrated in FIG. 4, embodies the data structure which is the way of storing model data in a fashion which makes it readily usable for Finite Element Analysis.

Main menu processing, submenu processing and mode/submode processing represent processing alternatives. Which alternative is to be implemented at any particular time is determined by computer 14 on the basis of the current location of stylus 36. Interrelated FIGS. 5, 5A and 5B illustrate how this determination can be made as well as how the processing alternatives may be implemented.

As shown in FIG. 5 the initial step 94 is to acquire the current stylus location from digitizer tablet 12. A comparison is then made at inquiry 96 to determine whether the instantaneous y coordinate ($Y_i$) is greater than the y coordinate ($Y_{MENBOT}$) of the boundary between the graphics workspace and menu region on the surface of the ditizer tablet. If the stylus is below this boundary (i.e. in the graphics workspace), then mode/submode processing occurs. If, however, $Y_i$ is greater than $Y_{MENBOT}$ a comparison is made in inquiry 98 (FIG. 5A) to determine whether the instantaneous x coordinate ($X_i$) is greater than the x coordinate ($X_{MID}$) of the boundary between the main menu area and submenu area on the surface of the digitizer tablet. If $X_i$ is not greater than $X_{MID}$ then submenu processing occurs. On the other hand, if $X_i$ is greater than $X_{MID}$ main menu processing occurs. In this fashion computer 14, in real time, repeatedly determines which area on the surface of the digitizer tablet the stylus is currently located in and performs the corresponding processing.

An exemplary flowchart for implementing main menu processing is shown in FIG. 5B. As indicated by blocks 100, 102 and 104 main menu processing initially draws the main menu display on the status screen if it is not already drawn, puts the menu box and associated message label corresponding to the current stylus location in solid inverted video, and puts the menu box and associated message label corresponding to the last stylus location in normal video. An inquiry 106 is then made to determine whether button 40 on stylus 36 has been pressed. If not, processing flows back to main loop 108. If the button has been pressed, indicating user selection of a main menu choice, an inquiry 110 is made to determine whether the main menu choice is a function. If not, the current mode is updated on status screen 18 and in memory 84 to reflect the user's mode selection, as denoted by box 112, and flow returns to main loop 108. If the user has selected a function, the corresponding menu box and associated label is put in blinking inverted video, the function is performed and then this menu box and associated label are returned to solid inverted video as indicated by boxes 114, 116 and 118 respectively. Flow then returns to main processing loop 108.

FIG. 5A illustrates typical submenu processing. Except for the fact that the particular submenu display depends upon the current mode, submenu processing is identical to the main menu processing, just described, and therefore need not be belabored herein.

FIG. 5 is a generalized flowchart of mode/submode processing. If inquiry 96 indicates that the stylus is in the graphics workspace, command 120 turns on the stylus and cursor interrupts, and the status display for the last selected mode/submode is drawn on status screen 18, as indicated by box 122. The intelligent cursor coordinates for the selected mode/submode are computed and data on the status screen is updated, as indicated in box 124. Inquiry 126 then determines whether $Y_i$ is greater than $Y_{MENBOT}$. If the response to this inquiry is positive, indicating that the stylus has entered the menu region, a command 128 turns off the stylus and cursor interrupts and flow returns to main processing loop 108. If the response to inquiry 126 is negative, inquiry 130 determines whether the button on the stylus has been pressed. If not, flow is channeled along subloop 132 until either the button is pressed or the stylus leaves the graphics workspace. If the response to inquiry 130 is positive, indicating user desire to perform the mode/submode operation, the site of the intelligent cursor on the graphics screen is accordingly edited and/or updated and corresponding data placed in memory, as indicated by box 134. Flow then continues along subloop 132 permitting further user action within the selected mode/submode until the stylus is moved out of the graphics workspace in which case flow returns to the main processing loop 108.

A unique feature of the Finite Element Modeling system of the present invention is the use of an intelligent cursor to guide the user in model creation, modification and analysis results interpretation. The intelligent cursor is displayed on graphics screen 16 at the one of a multitude of possible sites of interest, nearest the location of the dumb cursor. In a Finite Element Analysis System the types of sites of interest include nodes, elements and boundary segments. The particular type depends upon the mode/submode selected by the user.

As illustrated in the following examples, the intelligent cursor typically surrounds the nearest node, or the nearest boundary segment or is located in the element containing the dumb cursor. The shape of the intelligent cursor preferably varies with the different modes to provide the user with immediate visual feedback indicative of the current mode. The intelligent cursor anticipates the user's actions and constrains these actions to those appropriate for the particular mode. In addition, the intelligent cursor provides the user with immediate unambiguous visual feedback of whether a site the user wishes to select has in fact been selected.

FIG. 6 illustrates the use of an intelligent cursor in an Enter Elements mode, which is part of the model creation process. On graphics screen 16, nodes are indicated by "X"'s 136, elements by triangles such as 138 and quadrilaterals such as 140, and boundary segments by lines such as 142 connecting boundary nodes. A dumb cursor, in the form of "+" and designated 144 tracks on the graphics screen, in real time, the movement of stylus 36 in the graphics workspace of the digitizer tablet. After entering nodes necessary to fully describe the geometry of the object being modeled, the user can then form elements by choosing the Enter Elements mode in the main menu. This mode allows the user to enter elements manually be selecting three or four nodal points which constitute vertices of a triangular or quadrilateral element, respectively. After selecting this mode, the user enters the mode by moving the stylus into the graphics workspace. The Enter Elements mode status display is then presented on the status screen. Dumb cursor 144 appears on the graphics screen along with an intelligent cursor 146 in the shape of a star. The intelligent cursor encapsulates the node nearest to the current location of the dumb cursor. If this node is one of the vertices for the element being formed, the user indicates a selection by pressing the stylus button and a line is drawn on the graphics screen connecting the encapsulated node to one previously selected. The user then manipulates the stylus to move the dumb cursor into the vicinity of another node and the intelligent cursor jumps to that node providing the user with unambiguous visual feedback of the site being selected. By limiting the sites of interest in this mode to nodes, the intelligent cursor constrains the user to appropriate data entry for this particular mode. The user need not position the dumb cursor exactly at the node he wishes to select since the intelligent cursor anticipates his intentions by jumping to the node nearest the location of the dumb cursor.

Figure 8:
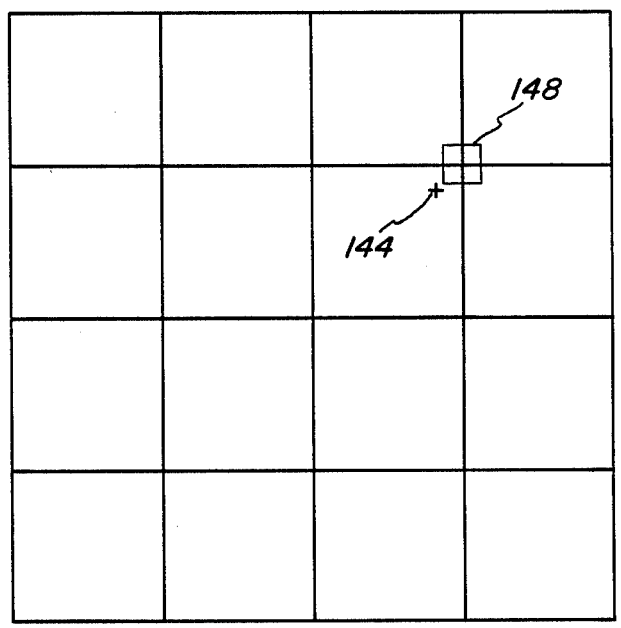
FIG. 8 is a diagrammatic representation of intelligent cursor operation in a Delete Nodes mode.

FIG. 8 illustrates the use of an intelligent cursor in a Delete Nodes mode. This mode allows the user to quickly delete individual nodes. When the user enters the Delete Nodes mode, the dumb cursor 144 appears on the graphics screen and tracks the movement of the stylus on the surface of the digitizer tablet. An intelligent cursor 148 in the shape of a box surrounds the node closest to the dumb cursor (note for simplicity of illustration, in this and subsequent figures, nodes are shown not as "X"'s but merely as the vertices of elements). When the user enters the Delete Nodes mode a status display 150 such as that shown in FIG. 7 appears on status screen 18. A prompt such as "Ready To Delete Node" will appear on status screen 150, along with the node number, temperature assignment and temperature constraints, if any, of the node boxed in by intelligent cursor 148. If the user presses the stylus button, this node will be deleted. All elements which utilize this node as a vertex will also be deleted on the graphics screen and the status screen will be updated to reflect the new number of nodes and elements.

A method of determining the node to be encapsulated by an intelligent node cursor will now be described. To find the node closest to the current location $(X_o, Y_o)$ of the dumb cursor, the distance (d) of each node from the dumb cursor position is evaluated. The node associated with the minimum distance is chosen to be encapsulated by the intelligent node cursor. If this distance is greater than a prespecified proximity tolerance, no node is identified by the intelligent cursor.

The distance (d) can be evaluted by either of the metrics provided below or any other suitable metric. For a node i $$d(i) = \sqrt{(X(i) - X_0)^2 + (Y(i) - Y_0)^2} \quad \text{2 dimensions}$$

$$d(i) = \sqrt{(X(i) - X_0)^2 + (Y(i) - Y_0)^2 + (Z(i) - Z_0)^2} \quad \text{3 dimensions}$$

where X(i), Y(i), Z(i) represent the positional, cartesian coordinates of node i in a 2 or 3 dimensional space.

Several modifications may be made to increase the computational efficiency of this distance calculation.

The square of the distance may be used, thus eliminating the need for performing a square root operation:

$$d^2(i) = (X(i) - X_o)^2 + (Y(i) - Y_o)^2 \text{ (2 dimensions)}$$

$$d^2(i) = (X(i) - X_o)^2 + (Y(i) - Y_o)^2 + (Z(i) - Z_o)^2 \text{ (3 dimensions)}$$

Alternately, a non Euclidian metric can further increase computational efficiency:

$$d(i) = |X(i) - X_o| + |Y(i) - Y_o| \text{ 2 dimensional}$$

$$d(i) = |X(i) - X_o| + |Y(i) - Y_o| + |Z(i) - Z_o| \text{ 3 dimensional}$$

(where $|X(i) - X_o|$ represents the absolute value of the difference between the X coordinate of node i and the X coordinate of the dumb cursor, $|Y(i) - Y_o|$ represents the absolute value of the difference between the Y coordinates and $|Z(i) - Z_o|$ represents the absolute value of the difference between the Z coordinates.)

Figure 11:
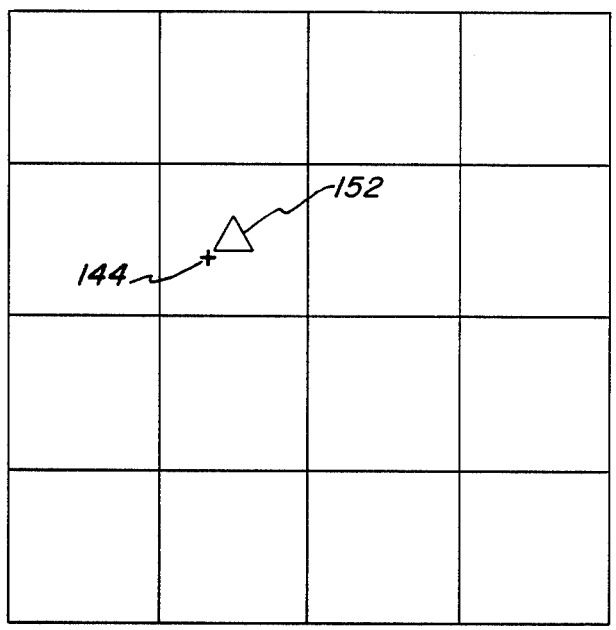
FIG. 11 is a graphical depiction of intelligent cursor operation in an Assign By Element mode.

FIG. 11 illustrates the use of an intelligent cursor in an Assign By Element mode. This main mode allows the user to easily move from element to element to change current elemental assignments such as material name, part name and/or heat generation to previously designated default assignments. When the user enters the Assign By Element mode, dumb cursor 144 appears on the graphics screen at a location corresponding to the current location of the stylus in the graphics workspace of the digitizer tablet. An intelligent cursor 152, in the form of a triangle, will appear in the center of the element within which the dumb cursor lies. At the same time, status display 69 corresponding to this mode appears on the status screen 18 as shown in FIG. 9. The current assignments for the element containing the intelligent cursor will be updated on the status screen and the lower left hand portion of status display 69 will indicate the current intelligent cursor position. If the user presses the stylus button, the element containing the intelligent cursor will have those current assignments for which the reassignment switch is ON changed to the default assignments. The current assignments for the element will be updated on the status screen. In this manner the user can easily hop around to all elements of the model and update their current assignments. Reassignment switches can be set by selecting the appropriate submodes from the corresponding submenu 56 illustrated in FIG. 10.

A method for determining the element in which an intelligent element cursor should be located will now be described. The intelligent element cursor is located with the element (if any) within which the coordinates of the dumb cursor fall. For two dimensions, this is determined as follows:

The mathematical problem is to determine if an arbitrary point $(X_o, Y_o)$, representing the location of the dumb cursor, lies within a generalized quadrilateral with vertices $(X_1, Y_1)$, $(X_2, Y_2)$, $(X_3, Y_3)$, $(X_4, Y_4)$ for those elements which are quadrilateral, or within a triangle with vertices $(X_1, Y_1)$, $(X_2, Y_2)$ and $(X_3, Y_3)$ for those elements which are triangular.

This is determined by formulating the discriminant of the equation of the line connecting two adjacent vertices. The dumb cursor coordinates are then substituted into this discriminant equation in order to determine on which side it lies. The sign of the discriminant will be positive if the coordinates are to one side of the line and negative if the coordinates are on the other side. Next, one of the remaining vertices (which was not used to form the line) is substituted into the line equation to form a second discriminant. If the signs of the two discriminants are not the same, the dumb cursor cannot lie within the element being tested. If they are the same, the process is continued for each line segment comprising the element. If the signs of the discriminants match for each side (4 for quadrilaterals, 3 for triangles), then the element under consideration contains the dumb cursor coordinates and the intelligent cursor is drawn in that element.

The generalized equation for a line in 2 dimensional space is:

$$y = mx + b$$

where m=slope and b=y axis intercept For a line between vertices $(X_1, Y_1) + (X_2, Y_2)$ $$Y = \frac{(Y_2 - Y_1)}{(X_2 - X_1)} X + Y_1 - \frac{(Y_2 - Y_1)}{(X_2 - X_1)} X_1$$

or $$Y - \frac{(Y_2 - Y_1)}{(X_2 - X_1)} X + \frac{(Y_2 - Y_1)}{(X_2 - X_1)} X_1 - Y_1 = 0$$

For dumb cursor coordinates $(X_o, Y_o)$, $$Y_0 - \frac{(Y_2 - Y_1)}{(X_2 - X_1)} X_0 + \frac{(Y_2 - Y_1)}{(X_2 - X_1)} X_1 - Y_1 =$$

Discriminant(0:1-2)

The sign of this discriminant is compared to that generated from vertex 3:

$$Y_3 - \frac{(Y_2 - Y_1)}{(X_2 - X_1)} X_3 + \frac{(Y_2 - Y_1)}{(X_2 - X_1)} X_1 - Y_1 =$$

Discriminant(3:1-2)

If the signs are the same, the process is continued for each of the other line segments comprising the element being considered. If, for each segment, the sign of the discriminant generated by the dumb cursor coordinates matches the sign of the discriminant generated by the test vertex, the stylus coordinates lie within this element. This approach can be directly generalized to 3 dimensions by utilizing planes instead of lines.

Figure 14:
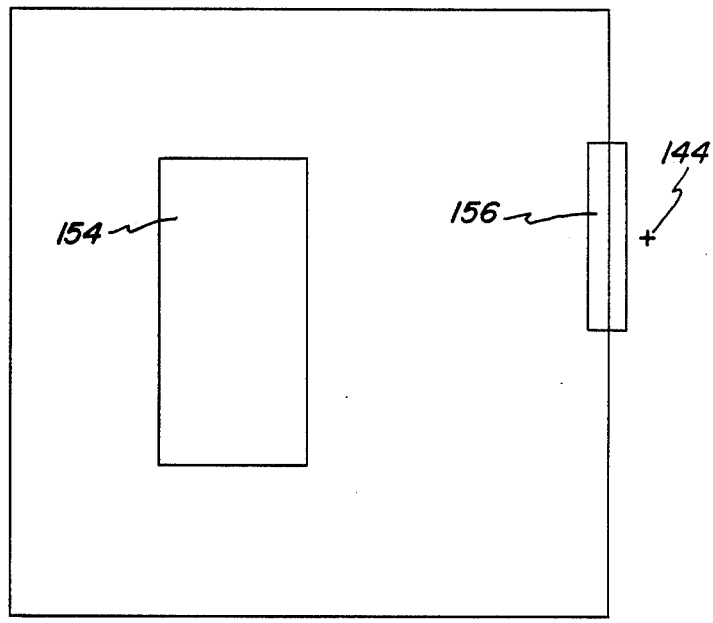
FIG. 14 is a simplified graphical depiction of a dumb cursor and intelligent cursor in the Specify Boundary Conditions mode.

FIG. 14 illustrates the use of an intelligent cursor in a Specify Boundary Conditions mode. This mode allows the user to easily set or change current boundary condition assignments such as radiation factor, radiator temperature outside the boundary, heat transfer coefficient, fluid temperature outside the boundary and applied flux density. When the user enters the Specify Boundary Conditions mode the system will preferably first draw an outline of the model depicting all boundary segments. Holes such as 154 inside the model will be bounded. After the boundary is drawn, the dumb cursor 144 will appear on the graphics screen. As usual the movement of the dumb cursor on the graphics screen will track the movement of the stylus on the surface of the digitizer tablet. An intelligent cursor 156, in the form of a parallelogram, will surround the closest boundary leg or segment to the dumb cursor. The current assignments for this boundary leg will be concurrently updated on the corresponding status display 158 on status screen 18 (reference FIG. 12). When the user presses the stylus button, the boundary leg surrounded by the intelligent cursor will have those current assignments for which the reassignment switch is ON changed to the default assignments. The current assignments for the boundary leg will be updated on the status screen. In this manner the user can easily slide around the entire boundary of the model and update the current assignments for each boundary leg. The reassignment switches may be set by selecting the appropriate submodes from the corresponding submenu display 68 illustrated in FIG. 13.

A method for identifying boundary nodes and then determining the boundary leg to be encapsulated by an intelligent boundary cursor will now be described. To identify boundary nodes one sequences through all elements in the model. For each element, one sequences through sets of vertex pairs defining the elements (four sets for quadrilaterals, three sets for triangles). For each vertex pair, one sequences through all of the other vertex pairs in the model. If no other vertex pair matches the pair being tested, then both nodes of the vertex pair being tested are boundary nodes and the line segment between them is a boundary leg.

The intelligent boundary cursor surrounds the boundary leg closest to the stylus position, provided this distance is less than a prespecified proximity tolerance.

One suitable method for deciding which boundary leg to select for the intelligent boundary cursor is to sequence through all boundary legs. For each leg, the X coordinates of the endpoints are averaged, as are the Y coordinates. These averaged coordinates can then be treated in a manner directly analogous to that used for the intelligent node cursor. If the endpoints of boundary leg K are $(X_1, Y_1)$ and $(X_2, Y_2)$, the midpoint $(\overline{X}, \overline{Y})$ is found as follows:

$$\overline{X} = \frac{X_1 + X_2}{2} \quad \overline{Y} = \frac{Y_1 + Y_2}{2}$$

Each coordinate pair $(\overline{X}, \overline{Y})$ can then be treated as described above with respect to the intelligent node cursor. This approach can be directly generalized to three dimensions by using the 3 or 4 vertices constituting a boundary plane.

FIG. 16 illustrates the use of an intelligent cursor in a View Analysis Results mode. The analysis results are presented as isotherms 160 superimposed upon a model 162. An intelligent cursor 164, in the shape of a diamond, jumps to the node (not shown) nearest the current location of dumb cursor 144. In this mode the sites of interest, i.e. the invisible nodes are provided with a prespecified tight proximity tolerance. The intelligent cursor 164 appears at the nearest node only when the dumb cursor comes within this proximity tolerance, as illustrated in the lower left hand portion of FIG. 16. This will allow easy inspection of nodal condition assignments, e.g. node temperature on a corresponding status display 166 presented on status screen 18, as illustrated in FIG. 15.

As illustrated in the right bottom side portion of FIG. 16, if the dumb cursor is not within the proximity tolerance, the intelligent cursor 164 will overlie the dumb cursor 144 and associated status display 166 will present an interpolated temperature value corresponding to the current position of these cursors. For simplicity of illustration purposes, both conditions are shown in FIG. 16; however, in actuality only one dumb cursor and one intelligent cursor are displayed on the graphics screen in this mode.

Figure 17:
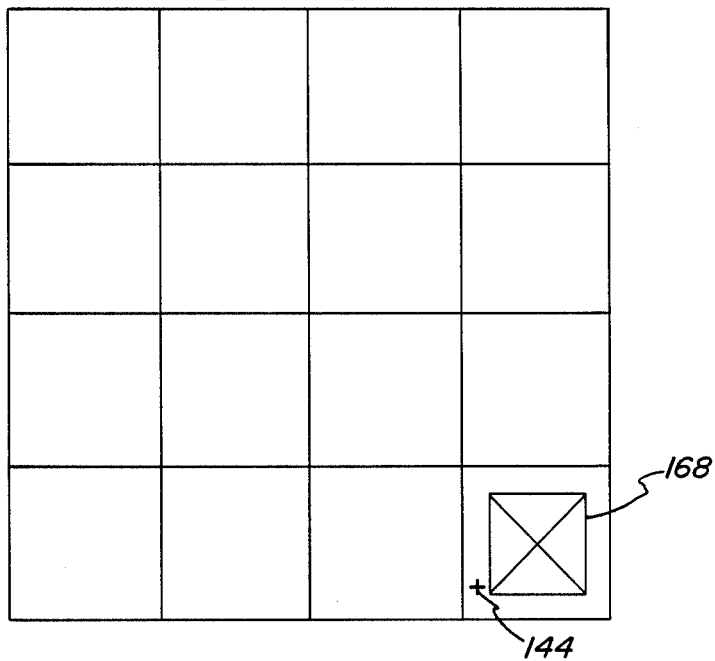
FIG. 17 graphically illustrates intelligent cursor operation in a Delete Elements mode.

FIG. 17 illustrates the use of an intelligent cursor in a Delete Elements mode. In a fashion similar to the Assign By Element mode an intelligent cursor 168 is made to appear within the element containing dumb cursor 144. In this mode the intelligent cursor may take the form of a miniature depiction of the shape of the element within which it is positioned.

Figure 18:
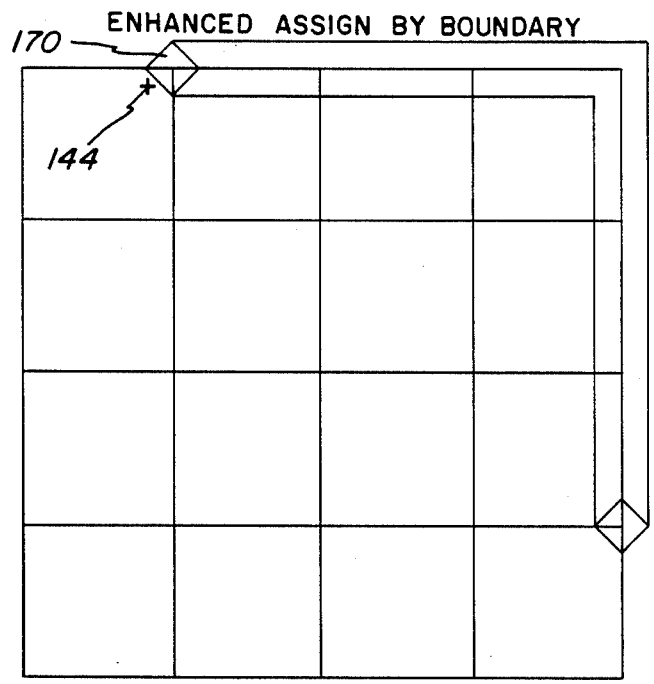
FIG. 18 is a graphical depiction of an Enhanced Assign By Boundary mode.
Figure 19:
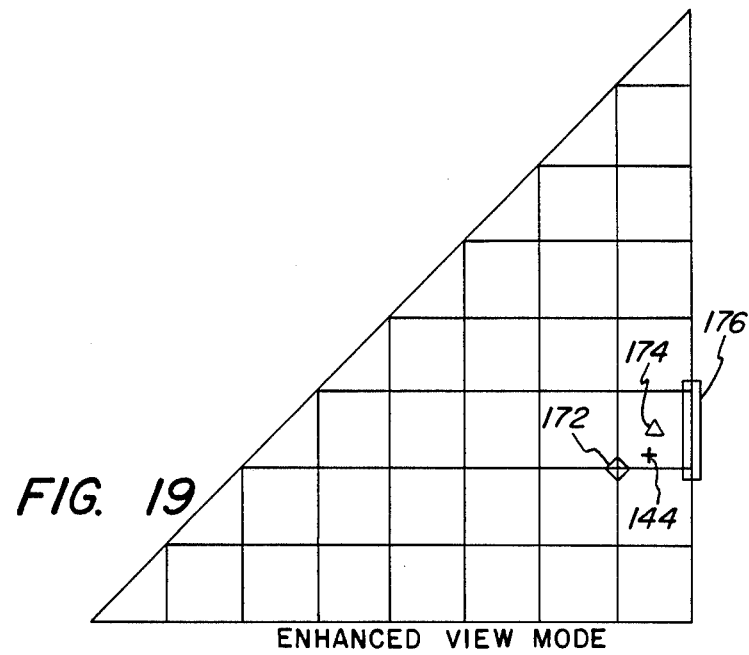
FIG. 19 depicts the simultaneous display of multiple intelligent cursors in an Enhanced View mode.

FIG. 18 illustrates graphically how an intelligent boundary node cursor 170 can be used to define an extended boundary in an Enhanced Assign By Boundary mode, as the user moves dumb cursor 144 along the desired boundary. In a similar fashion, an intelligent node cursor, not limited to boundary nodes, may be used to enclose a region for purposes of, for example, defining a part without the need for element by element assignment. FIG. 19 illustrates an Enhanced View mode in which an intelligent node cursor 172, intelligent element cursor 174 and an intelligent boundary cursor 176 can be simultaneously displayed on the graphics screen. Data corresponding to each of the intelligent cursors could be displayed on the corresponding status screen.

Although a number of examples of intelligent cursor operation have been discussed, it is obvious that numerous modifications and variations in the nature and operation of such cursors can be made without diminishing the following significant benefits afforded by the intelligent cursor: unambiguous indication of the site being selected, anticipation of the user's actions in a particular mode, and user constraint to valid data entry operations for the selected mode.

It will now be appreciated that the Finite Element Modeling system of the present invention fulfills the objects set forth above. The intelligent interactive user interface features of this invention facilitate efficient, rapid and error free model creation and manipulation, and interpretation of analysis results. The system provides a powerful, affordable tool which allows engineers without specialized knowledge in mathematical modeling to employ Finite Element Analysis to solve practical problems in diverse fields.

Although the invention has been described and illustrated in terms of a presently preferred embodiment, numerous substitutions, variations and modifications can be made without departing from the scope of the invention. The system, for example, can be readily extended to three dimensional models; instead of a digitizer tablet, a joystick or other positional data entry device may be employed; an intelligent cursor can be applied to other sites of interest such as parts, guidelines or guidecurves. Other variations will occur to those skilled in this art. All such variations are considered to fall within the spirit of this invention; the scope of which is defined by the claims appended hereto.

What we claim is:

1. Apparatus for facilitating user interaction with a computer aided design or modeling system in which a user makes selections among various processing modes from a menu and enters pictorial data, comprising:

a digitizer tablet having a work surface divided by a boundary into a graphics workspace for entering pictorial data and a menu region for selecting among various processing modes, pointing means which can be positioned at different locations on said surface by a user, and means for providing a position signal identifying the current location on the surface of the pointing means;

display means for displaying alphanumeric information on a status screen; and computer means for monitoring the position signal from the digitizer tablet and determining from said signal whether the pointing means is entering the graphics workspace or menu region, the computer means in response to said determination controlling, in real time, the display means to automatically provide a menu display on the status screen indicative of modes available for selection by the user when the pointing means enters the menu region, and to substitute a mode-dependent status display for said menu display on said status screen when the pointing means enters the graphics workspace, whereby the display presented on the status screen is automatically correlated with the user's positioning of the pointing means across said boundary.

2. The apparatus of claim 1 wherein the computer means comprises means substantially continuously comparing the current location of the pointing means with the location of the boundary between the menu region and the graphics workspace.

3. The apparatus of claim 2 wherein the menu region comprises a multitude of discrete locations, the discrete locations being individually associated with corresponding available modes, and wherein when the pointing means is positioned at one of said discrete locations, the corresponding mode is identified in the menu display on the status screen.

4. The apparatus of claim 3 wherein the menu display identifies all of the available modes.

5. The apparatus of claim 4 wherein the corresponding mode is indicated by a distinguishing video presentation.

6. The apparatus of claim 4 wherein the digitizer tablet further includes selection means for the user to indicate selection of a mode associated with a particular discrete location, when the pointing means is positioned at the particular discrete location, and wherein the mode selected by the user is identified in the menu display.

7. The apparatus of claim 6 wherein a status display is associated with each available mode and wherein the status display substituted for the menu display when the pointing means enters the graphics workspace comprises a status display corresponding to the last mode selected by the user.

8. The apparatus of claim 7 wherein the menu region further includes a discrete location associated with a function, wherein when the pointing means is positioned at said discrete location associated with a function, the function is identified in the menu display, and wherein if the user selects the function, the selection of the function is indicated in the menu display while the system performs the function.

9. The apparatus of claim 7 wherein the menu region comprises a main menu area and a submenu area, the computer means determines whether the pointing means is entering the main menu area or the submenu area, and the computer means controls the display means to provide a main menu display on the status screen indicative of main modes available for selection by the user when the pointing means enters the main menu area and substitutes a main mode dependent submenu display on the status screen indicative of submodes available to the user in a selected main mode when the pointing means enters the submenu area.

10. The apparatus of claim 9 wherein the substituted submenu display comprises a submenu display associated with the last main mode selected by the user.

11. The apparatus of claim 10 wherein at least one main mode has a forced submenu display which is presented on the status screen whenever the pointing means leaves the main menu area, after such main mode has been selected by the user.

12. The apparatus of claim 10 further including graphics display means for displaying a dumb cursor at a location on a graphics screen corresponding to the location of the pointing means in the graphics workspace, the dumb cursor tracking in real time on the graphics screen movement of the pointing means in the graphics workspace; and means for generating and displaying an intelligent cursor at one of a plurality of possible sites of interest on the graphics screen, said one site being the site nearest the current location of the dumb cursor, whereby the intelligent cursor provides unambiguous feedback to the user of the nearest site of interest to the current location of the dumb cursor as the dumb cursor is moved across the graphics screen in correspondence with the user's movement of the pointing means.

13. The apparatus of claim 12 wherein the type of sites of interest and the visual characteristics of the intelligent cursor depend upon the main mode last selected by the user, and wherein the user's actions in a selected mode are anticipated and constrained by the intelligent cursor associated with the selected mode.

14. The apparatus of claim 13 wherein the computer means updates in real time information in the status display on the status screen in accordance with the current location of the intelligent cursor on the graphics screen.

15. The apparatus of claim 14 wherein user activation of the selection means when an intelligent cursor is displayed at a particular site of interest on the graphics screen causes the system to undertake mode specific processing at the particular site of interest, the results of said processing being displayed on at least one of the graphics screen and the status screen.

16. The apparatus of claim 15 wherein a proximity tolerance is assigned to sites of interest in at least one mode such that the dumb cursor must come within a specified proximity of the nearest site of interest before an intelligent cursor appears at said nearest site.

17. The apparatus of claim 16 when the shape of the intelligent cursor is indicative of the mode last selected by the user.

18. The apparatus of claim 17 wherein the system comprises a finite element analysis system, the types of possible sites of interest comprise nodes, boundary segments, and elements, and wherein the intelligent cursor appears on the graphics screen surrounding the closest node to the dumb cursor, surrounding a portion of the closest boundary segment to the dumb cursor or within the element in which the dumb cursor is located, depending upon the mode selected by the user.

19. The apparatus of claim 18 wherein in one mode, different intelligent cursors are simultaneously displayed on the graphics screen.

20. Apparatus for facilitating user interaction with a computer aided design or modeling system in which a user may select among various processing modes and enter pictorial data, comprising:
   data entry means for user selection of a processing mode and user entry of pictorial information;
   graphics display means for displaying pictorial information on a graphics screen;
   first means for drawing on said graphics screen a first cursor at a location on the graphics screen specified by the user through said data entry means, said first cursor being respositionable by the user through said data entry means; and
   second means for automatically drawing on said graphics screen a second cursor at one of a plurality of possible sites of interest on said screen, said second cursor appearing on said graphics screen along with said first cursor, said sites of interest being dependent upon the processing mode selected by the user, said one site comprising the site of interest which is nearest to the location of the first cursor, whereby the second cursor anticipates the action of the user in the selected mode by jumping to the nearest site of interest to the first cursor as the first cursor is repositioned on the screen by the user.

21. The apparatus of claim 20 wherein the sites of interest for a selected mode constrain the user to valid operations in the selected mode.

22. The apparatus of claim 21 wherein a proximity tolerance is assigned to sites of interest in at least one mode such that the first cursor must come within a specified proximity of the nearest site of interest before a second cursor appears at said nearest site.

23. The apparatus of claim 21 wherein the second cursor has a shape distinctive from the shape of the first cursor and wherein the shape of the second cursor in one mode is different from the shape of the second cursor in a second mode.

24. The apparatus of claim 21 wherein the second cursor unambiguously identifies the nearest site of interest for the selected mode to the user.

25. The apparatus of claim 24 further comprising:
   alphanumeric display means for displaying alphanumeric information on a status screen; and
   third means controlling said alphanumeric display means to provide a mode-dependent status display on the status screen, said third means updating in real time information in the status display in accordance with the current location of the second cursor on the graphics screen.

26. The apparatus of claim 25 further comprising means for the user to initiate mode specific processing by the system when the second cursor is displayed at a particular site of interest on the graphics screen; and wherein the results of said mode specific processing is displayed on one of the graphics screen and status screen.

27. The apparatus of claim 26 wherein the system comprises a finite element analysis system, types of possible sites of interest comprise nodes, boundary segments, and elements, and wherein the second cursor appears on the graphics screen surrounding the closest node to the first cursor, surrounding a portion of the closest boundary segment to the first cursor, or within the element in which the first cursor is located, depending upon the mode selected by the user.

28. The apparatus of claim 27 wherein the data entry means comprises: a digitizer tablet having a work surface divided into a graphics workspace for entering pictorial data and a menu region for selecting among various processing modes, pointing means which can be positioned at different locations on said surface by the user, and means for providing a position signal identifying the current location on the surface of the pointing means; and further comprising:
   fourth means for determining from said position signal whether the pointing means is entering the graphics workspace or menu region, the fourth means controlling in real time the alphanumeric display means to substitute a menu display indicating modes available for selection by the user for the mode-dependent status display on the status screen when the pointing means enters the menu region from the graphics workspace.

29. The apparatus of claim 28 wherein in at least one mode, second cursors of different shape are simultaneously displayed at different types of sites of interest on the graphics screen.

30. The apparatus of claim 28 wherein said first means, second means, third means and fourth means comprises a single microcomputer, said single microcomputer also comprising means for performing the finite element analysis.

31. Apparatus comprising:
   a digitizer tablet having a surface divided into different regions, pointing means locatable in any one of said regions, and means for providing an output signal indicative of which region the pointing means is currently located in;
   display means separate from said tablet for presentation of alphanumeric information displays;
   control means for automatically detecting transition of the pointing means between different regions, said control means controlling the display means to switch, in real time, between different displays associated with said different regions respectively in correspondence with said transition; and
   wherein said different regions comprise a graphics workspace and a menu region, and said different displays comprise a mode-dependent processing status display and a menu display indicative of available processing modes, respectively.

32. Apparatus for facilitating user interaction with a finite element modeling system in which a user makes selections among various processing modes from a menu and enters pictorial data, comprising:
   positional data entry means having an associated workspace divided by a boundary into a graphics region for entering pictorial data and a menu region for selecting among various processing modes, pointing means which can be positioned by a user to designate different locations in said workspace, and means for providing a position signal identifying the current location in the workspace designated by the pointing means;
   display means for displaying alphanumeric information on a status screen; and
   computer means for receiving the position signal from the positional data entry means and determining from said signal whether the positioning means is entering the graphics region or menu region, the computer means controlling, in real time, the display means to provide a menu display on the status screen indicative of modes available for selection by the user when the pointing means enters the menu region, and to substitute a mode-dependent status display for said menu display when the pointing means enters the graphics region, whereby the display presented on the status screen continuously correlates with the user's positioning of the pointing means across said boundary.

* * * * *